United States Patent [19]

Knodt et al.

[11] Patent Number: 5,124,731

[45] Date of Patent: Jun. 23, 1992

[54] GENERATION OF DOCUMENT COVERS IN AN ELECTRONIC REPROGRAPHIC SYSTEM USING MEMORY

[75] Inventors: Kurt T. Knodt; Christopher W. Jacobus, both of Rochester; Daniel Fleysher, Pittsford, all of N.Y.

[73] Assignee: Xerox Corporation, Stamford, Conn.

[21] Appl. No.: 588,113

[22] Filed: Sep. 24, 1990

[51] Int. Cl.$^5$ .................................... G03G 21/00
[52] U.S. Cl. ............................ 346/157; 355/24; 355/319
[58] Field of Search .................. 355/23, 24, 26, 77, 355/209, 318, 319, 320; 358/75, 296, 401, 403, 444; 346/157; 271/3, 3.1, 4, 7, 65, 186

[56] References Cited

U.S. PATENT DOCUMENTS

| Re. 32,253 | 9/1986 | Bartulis et al. | 355/209 |
|---|---|---|---|
| 4,123,155 | 10/1978 | Hubert | 355/26 |
| 4,218,130 | 8/1980 | Satomi et al. | 355/319 |
| 4,727,402 | 2/1988 | Smith | 355/319 |
| 4,763,161 | 8/1988 | Forest et al. | 355/207 |
| 4,860,119 | 8/1989 | Maniwa et al. | 358/296 |

Primary Examiner—R. L. Moses
Assistant Examiner—Christopher Horgan
Attorney, Agent, or Firm—Duane C. Basch

[57] ABSTRACT

An electronic printing system having the capability of producing cover sheets for an output document set, including the ability to allow an operator to select the desired features of the cover sheets. Moreover, the system has a scanner for scanning an original document set, thereby producing an electronic representation of the set of original documents. Subsequently, the system is capable of automatically reordering the electronic images in a manner suitable to produce front and/or back cover sheets in accordance with the features previously selected. Finally, the output section of the system generates printed output of the reordered electronic images, thereby producing a completed document, including covers.

9 Claims, 24 Drawing Sheets

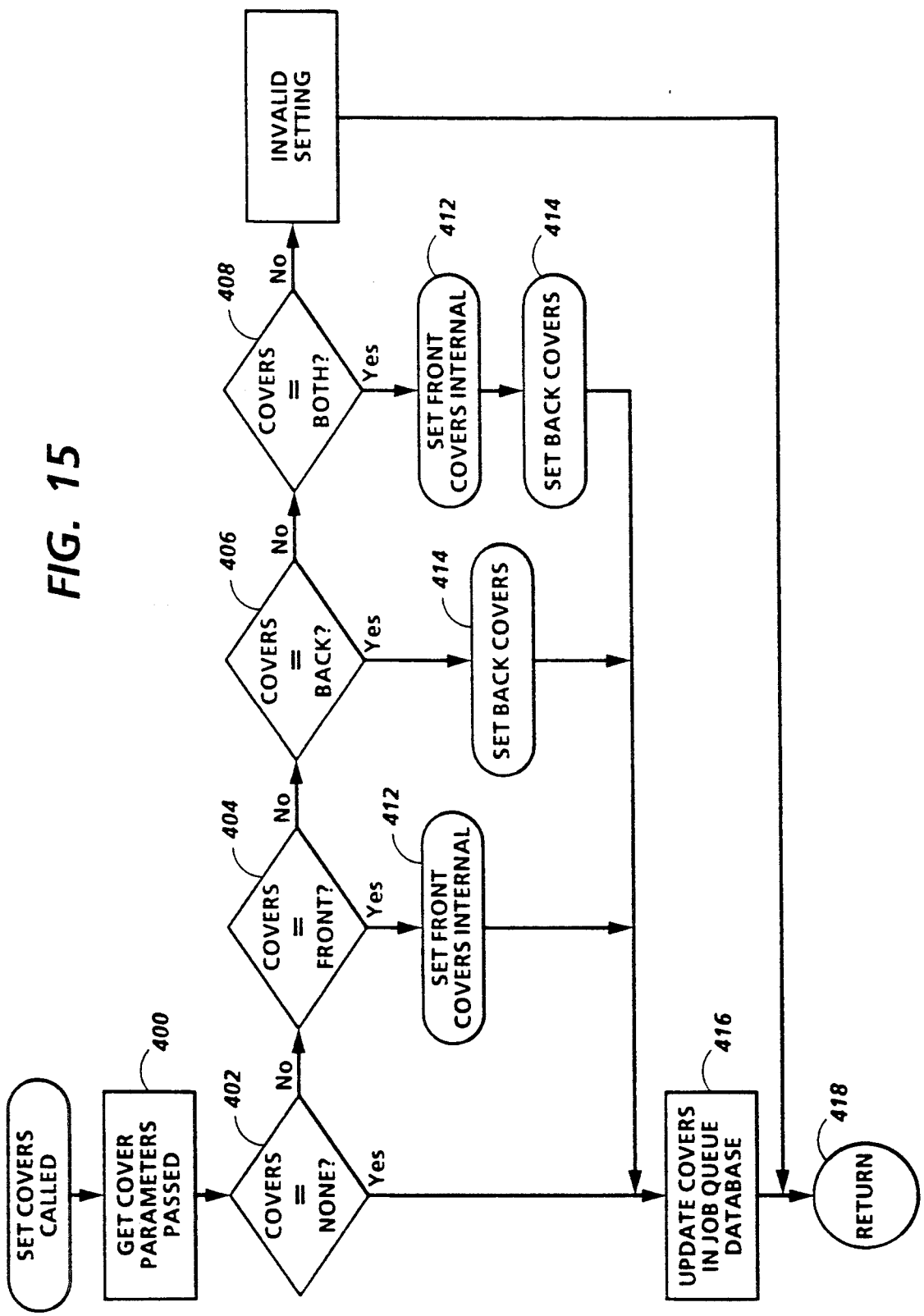

GENERATION OF DOCUMENT COVERS IN AN ELECTRONIC REPROGRAPHIC SYSTEM USING MEMORY

BACKGROUND OF THE INVENTION

1. Field of the Invention

The invention relates generally to an electronic reprographic system, and more specially to the method for controlling the generation of cover sheets for an electronically reproduced or electronically printed document.

2. Description of the Prior Art

In copying or printing a set of documents, it is occasionally desirable to insert into the output document set one or more sheets having a different characteristic. U.S. Pat. No. 4,763,161 to Forest et al. discloses a copier operable in an insert mode wherein a key sheet is used to mark the spot of an inserted sheet, wherein the inserted sheet may be either blank or have an image printed thereon. The inserted sheet is used to separate a stack of documents, different print jobs or collated sets. In the specific situation where the inserted sheets correspond to the respective beginning and/or end of a collated set, the inserted sheets may be considered cover sheets.

U.S. Pat. No. 4,218,130 to Satomi et al. discloses a method of automatically controlling a copying apparatus adapted to print images onto opposite surfaces of a copy sheet wherein the inputted documents, for example a book, can be arranged such that they are output in the same order and arrangement as the originals. A method of copying a left-hand bound book and a right-hand bound book are shown.

In general, the related art presented above does not teach the automatic insertion of cover sheets into an output document set. However, the Xerox 5090 ® Duplicator is capable of automatically adding front and/or back covers to a copy job, as described in the *Xerox 5090 Duplicator Operator Manual*, Xerox Corporation, Rochester, N.Y., Nov. 1988, pp. 4-13 through 4-15. Generally, the light-lens based reprographic system may be programmed by an operator to add front and/or back cover to an output document. Furthermore, the covers may have images placed thereon, as selected by the operator, in accordance with the output mode of the remainder of the copy job and the type of cover sheet selected. More specifically, the number of sides available for printing on the front and/or rear cover sheets is limited to the number of sides that are to be printed for the balance of the job (i.e. the non-cover sheets). In addition, should the cover sheet substrate have an unusual characteristic, such as a transparency, or letterhead and pre-drilled paper, additional operator intervention is required to ensure the desired cover appearance. Unfortunately, due to the required operator intervention, or inability to obtain the desired cover configuration, document cover sheets are frequently produced as a separate copying job, thereby requiring a post-production collation operation to combine the covers and documents.

In view of the limited capabilities for production of document set covers and with the added possibilities associated with an electronic reprographic system, the production of document cover sheets is rendered controllable by the reprographic system. In general, the ability of an electronic reprographic or printing system to utilize a stored digital image for the production of the output sheet gives rise to the possibility of a broader range of features for document covers, thereby enabling the output of covers in any possible configuration without regard for the configuration of the input document.

It is therefore an object of the present invention to provide a method of controlling the generation of cover sheets for an output document produced on an electronic reprographic system. It is an additional object of the present invention to enable the automatic printing of one or two sides of an inserted cover sheet, wherein the printed images correspond to predetermined input images. It is a further object of the present invention to automatically resolve any discontinuities, between the output set as originally programmed and the output set as produced with covers, that may arise as a result of the cover sheets having one or more printed images thereon. It is a final advantage of the present invention to eliminate the need for manual resolution of discontinuities between the original or input document set and the desired output document set, including cover sheets, thereby improving the efficiency of execution for copying jobs requiring the insertion of cover sheets.

Further advantages of the present invention will become apparent as the following description proceeds and the features characterizing the invention will be pointed out with particularity in the claims annexed to and forming a part of this specification.

SUMMARY OF THE INVENTION

The present invention is an electronic reprographic system having the capability of producing cover sheets for an output document set, including the ability to allow an operator to select the desired features of the cover sheets. Moreover, the system has a scanner for scanning an original document set, thereby producing an electronic representation of the set of original documents. Subsequently, the system is capable of automatically reordering the electronic images in a manner suitable to produce front and/or back cover sheets in accordance with the features previously selected. Finally, the output section of the system generates printed output of the reordered electronic images, thereby producing a completed document, including covers.

BRIEF DESCRIPTION OF THE DRAWINGS

For a better understanding of the present invention, reference may be had to the accompanying drawings wherein the same reference numerals have been applied to like parts and wherein:

FIG. 15 is a flowchart illustrating the various operations and procedure calls of the SetCovers procedure of the present invention;

DESCRIPTION OF THE PREFERRED EMBODIMENT

Figure 1:
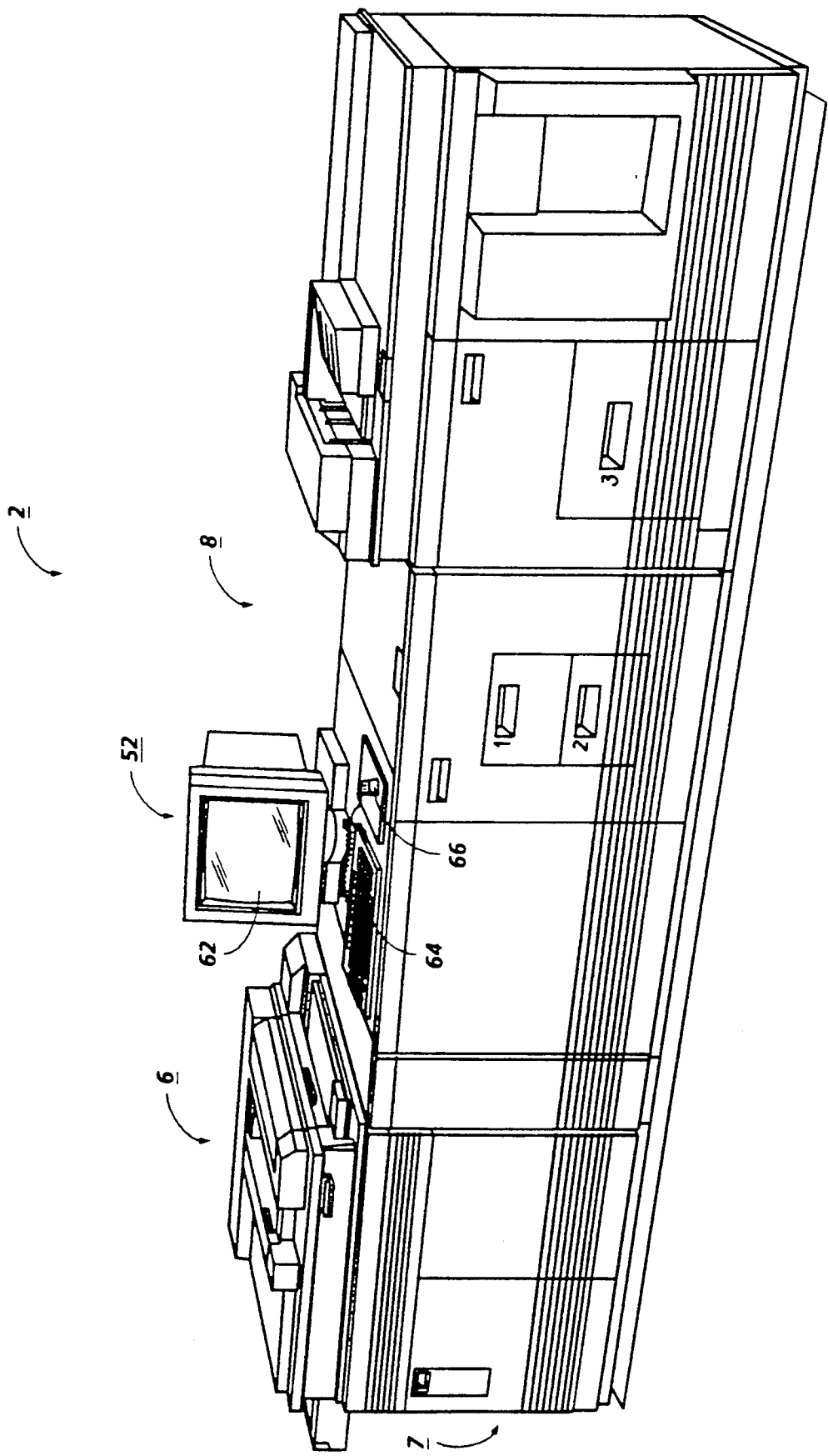
FIG. 1 is a view depicting an electronic printing system incorporating the printer priority function of the present invention.
Figure 2:
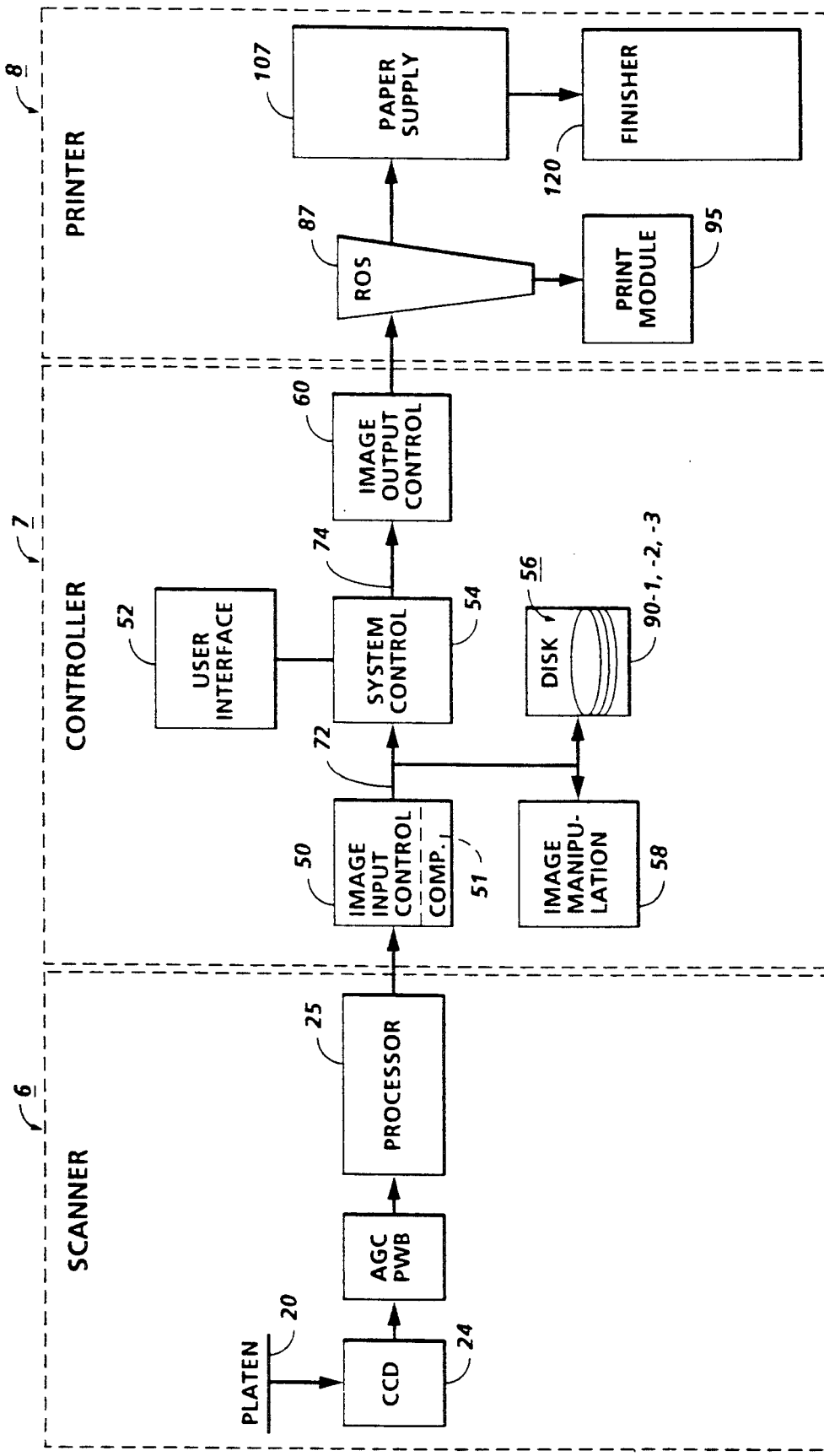
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
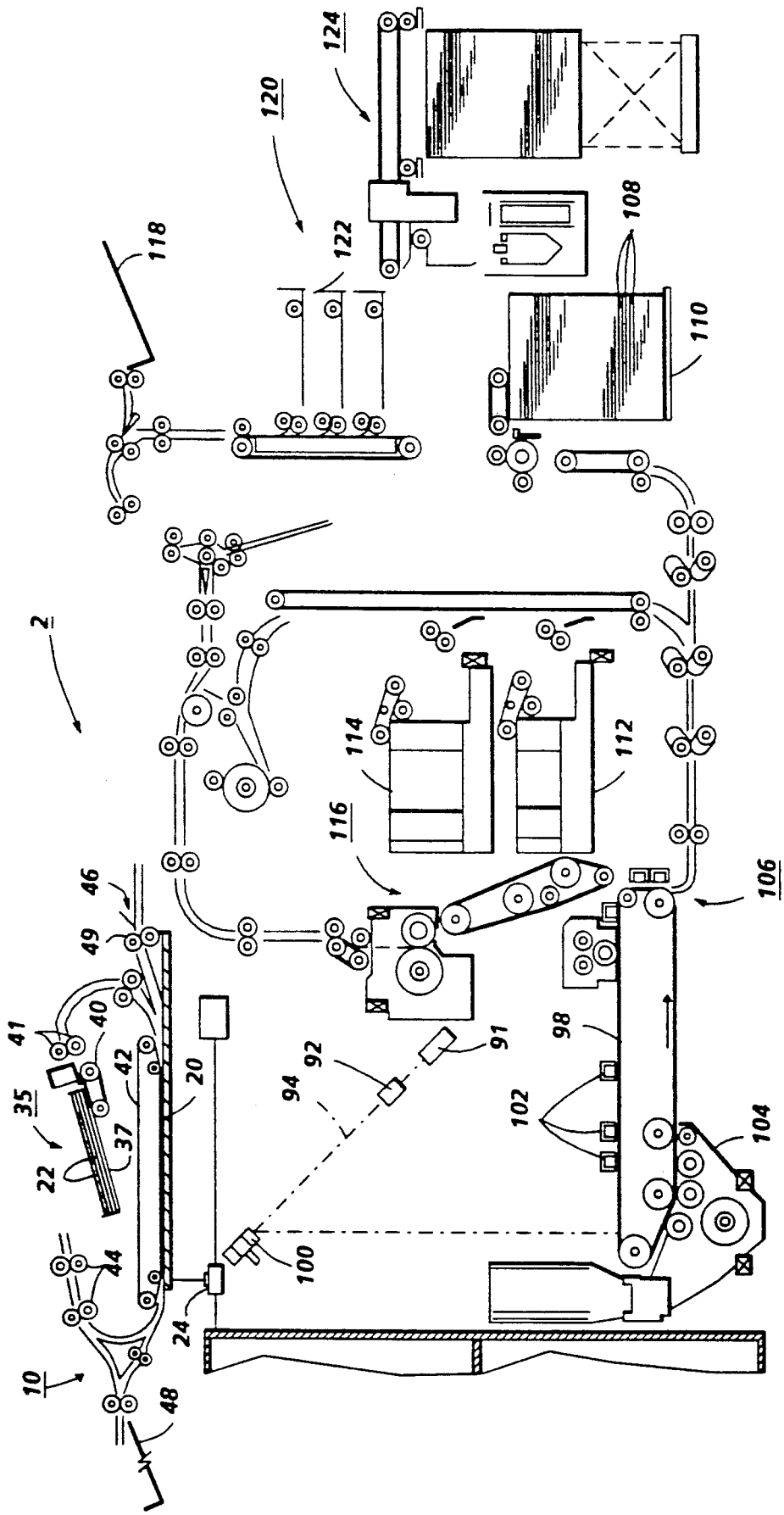
FIG. 3 is a plan view illustrating the principal mechanical components of the printing system shown in FIG. 1.
Figure 4:
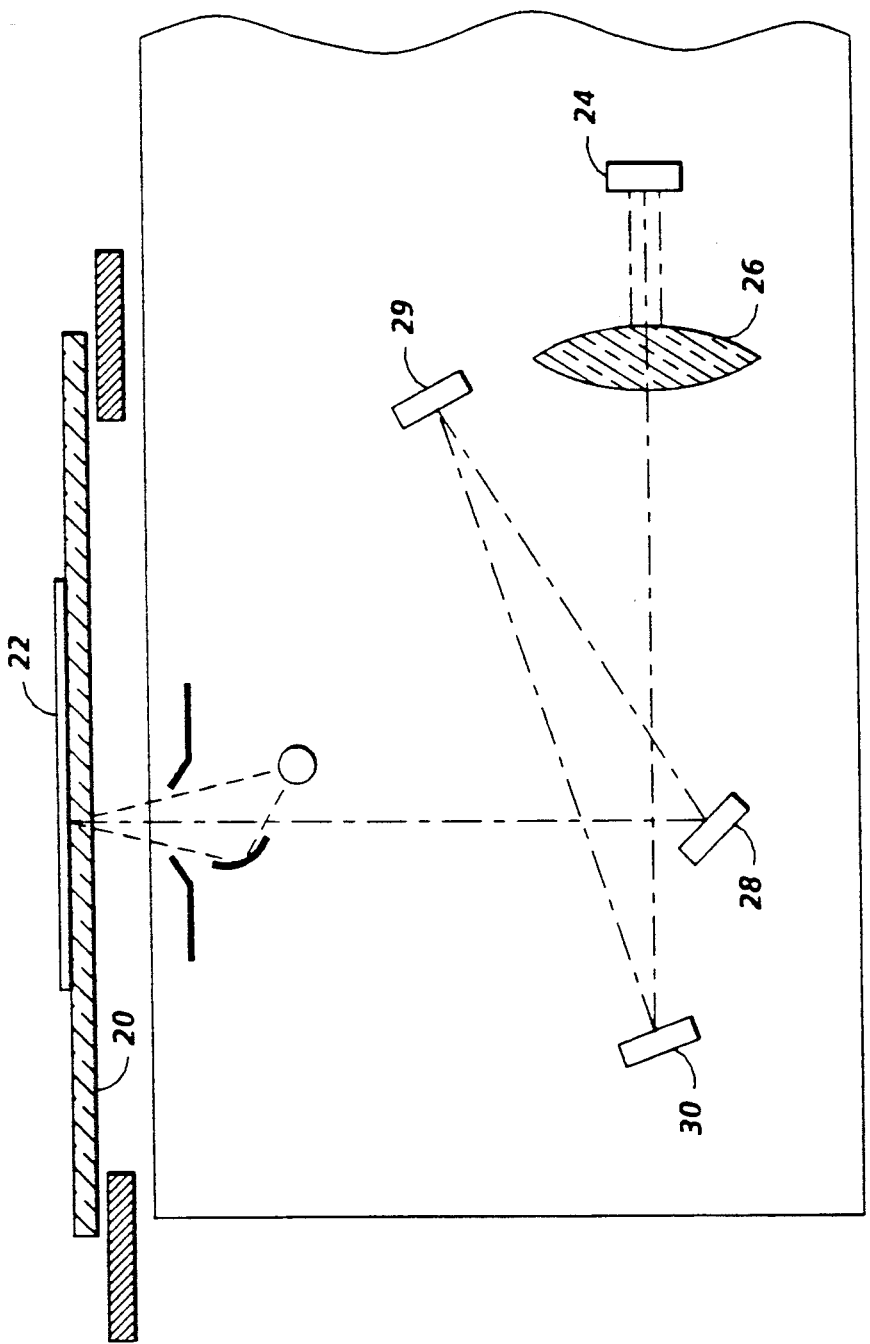
FIG. 4 is a schematic view showing certain construction details of the document scanner.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode a Semi-Automatic Document Handling (SADH) mode. A manual mode including a Book mode and a Computer Forms Feeder (CFF) mode are also provided, the latter to accomodate documents in the form of computer fanfold. For RDH mode operation, document handler 35 has a document tray 37 in which documents 22 are arranged in stacks or batches. The documents 22 in tray 37 are advanced by vacuum feed belt 40 amd document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87. Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stacker with stitcher 122 for stitching or stapling the prints together to form books and a thermal binder 124 for adhesively binding the prints into books.

Referring to FIGS. 1, 2, and 5, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

Figure 7:
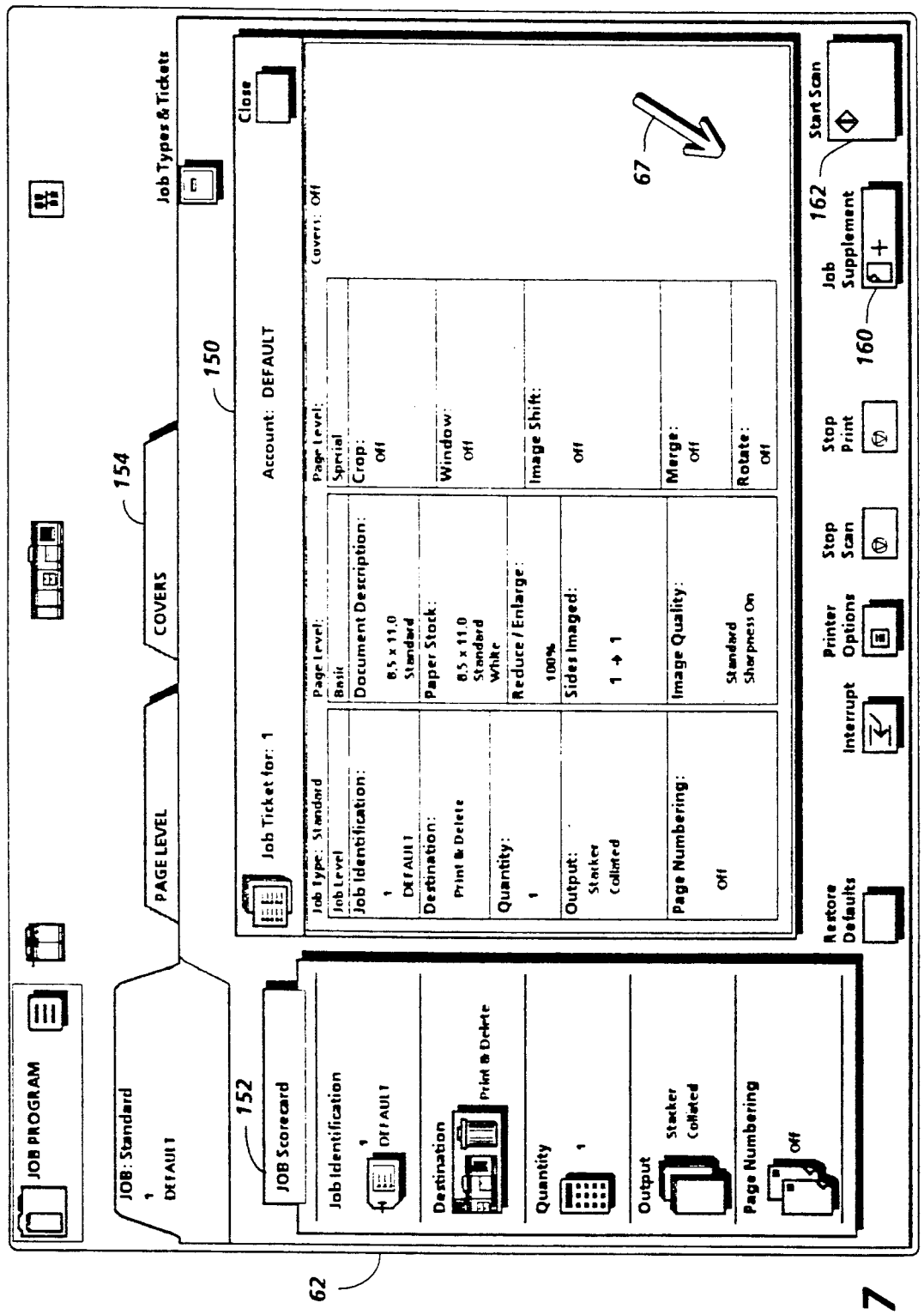
FIG. 7 is a view of the User Interface touchscreen display in the Job Programming mode displaying examples of Job Tickets and Job Scorecards used for programming jobs.
Figure 8:
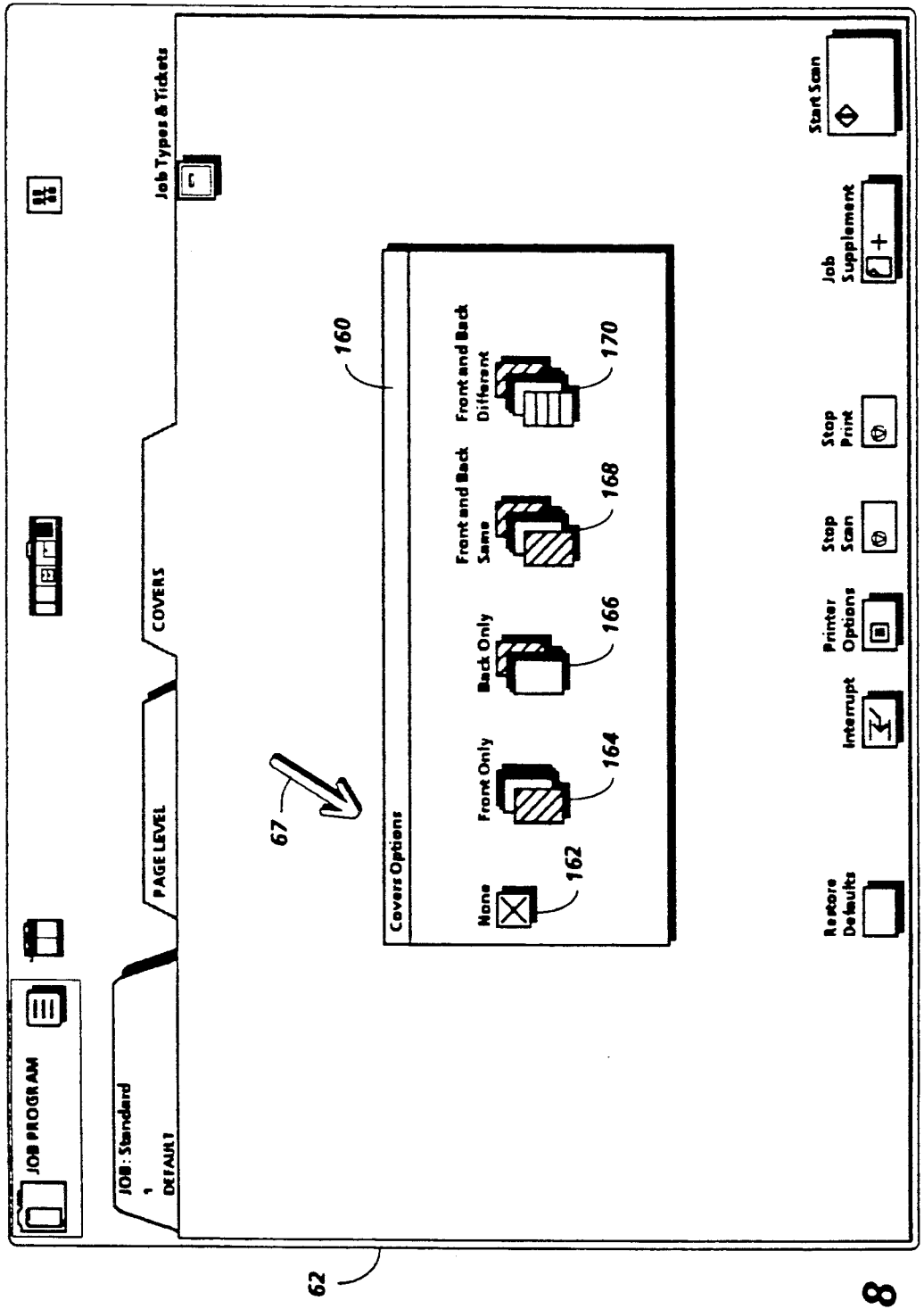
FIG. 8 is a view of the User Interface touchscreen display in the Covers programming mode displaying examples of the covers options.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Following programming and scanning in of the documents that comprise a job, the job data is placed in a job file. Referring also to FIGS. 7 and 8, items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc are carried out. Following processing, the data may be returned to main memory 56, sent to UI 52 for display on touchscreen 62, or sent to image output controller 60.

Figure 5A:
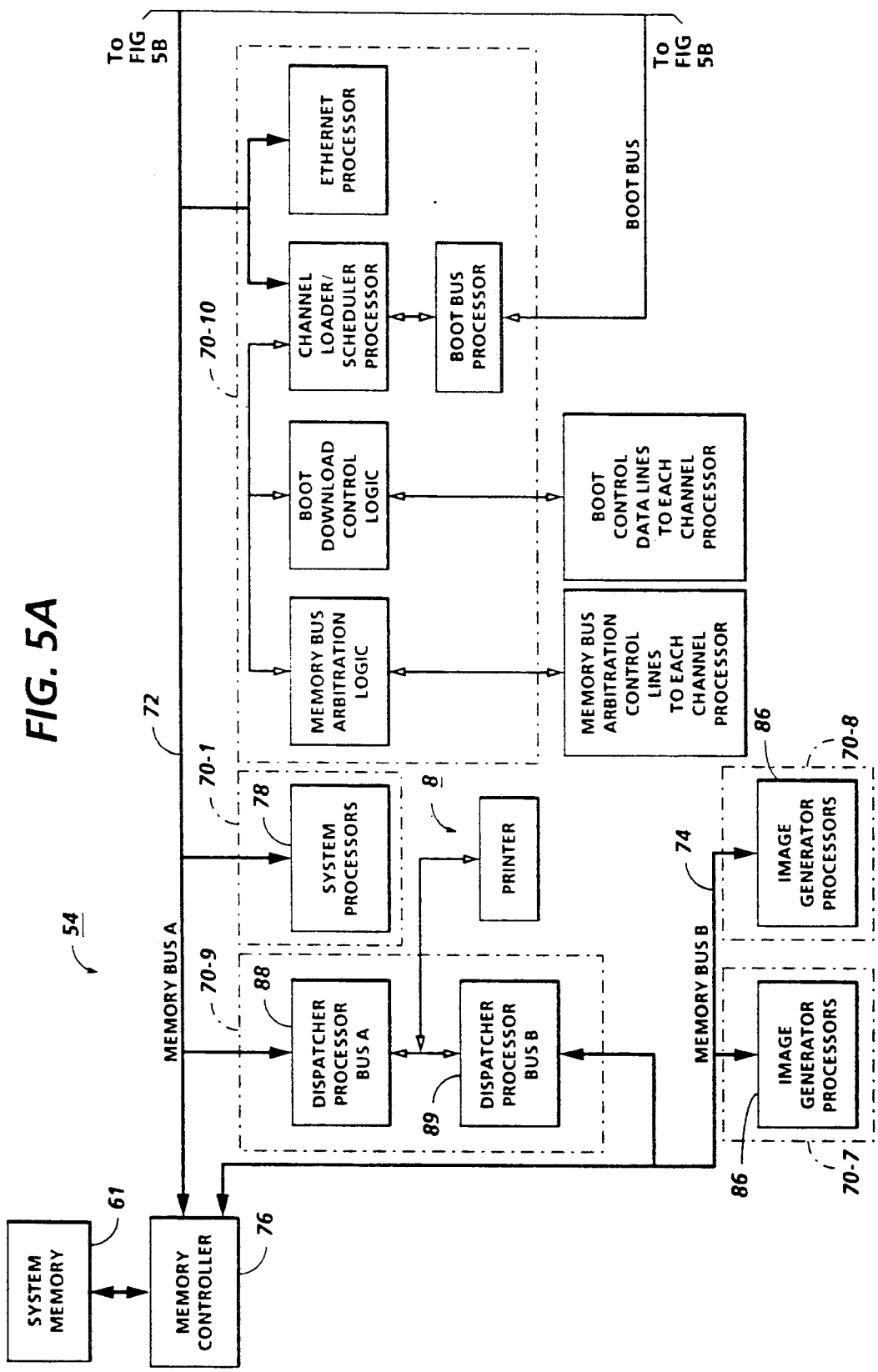
FIG. 5A-5C comprise a schematic block diagram showing the major parts of the system control section.

Image data output to image output controller 60 is decompressed and readied for printing by image generating processors 86 of PWBs 70-7, 70-8 (seen in FIG. 5A). Folowing this, the data is output by dispatch processors 88, 89 on PWB 70-9 to printer section 8. Image data sent to printer section 8 for printing is normally purged from memory 56 to make room for new image data.

Figure 5B:
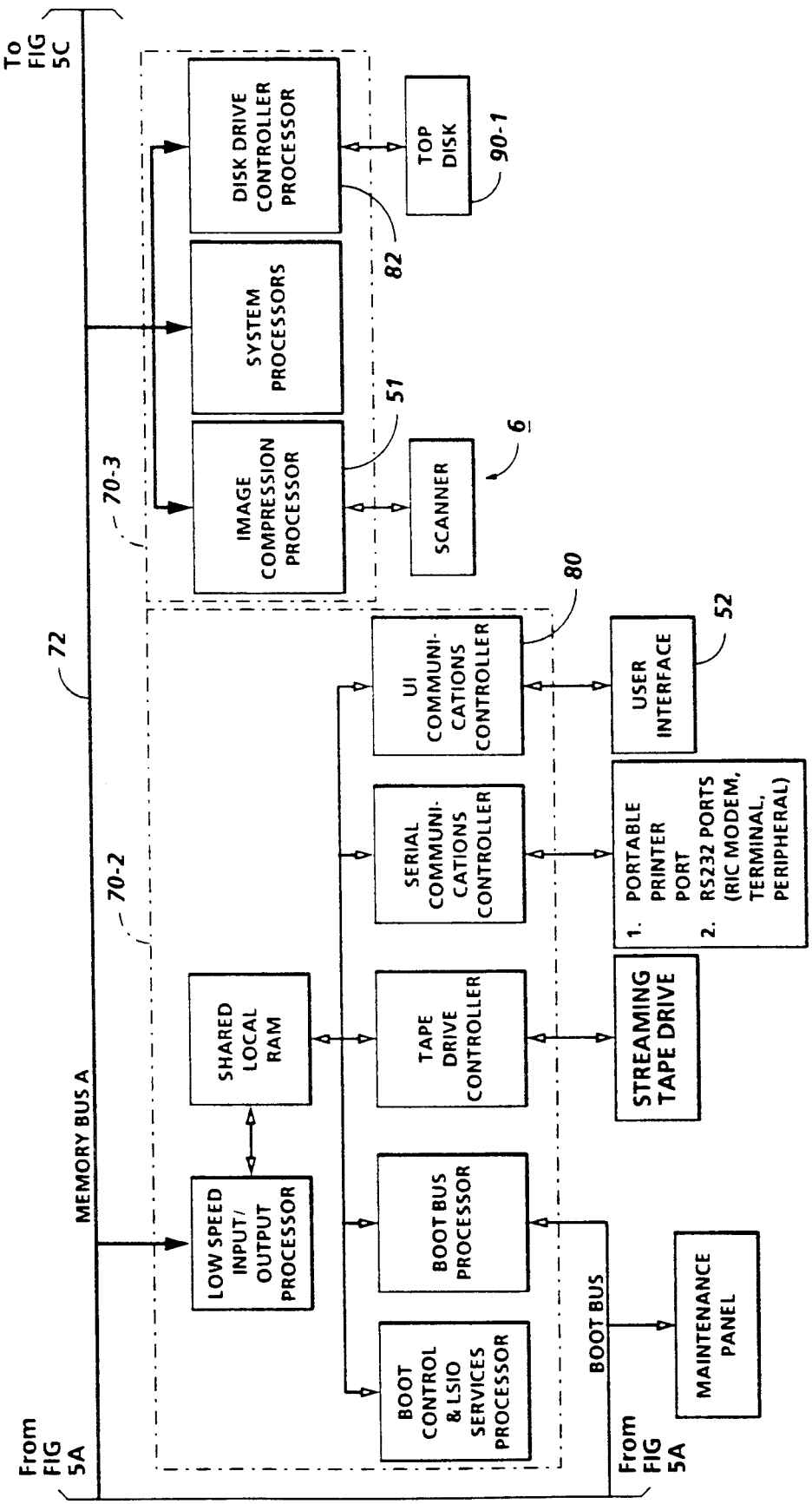
Figure 5C:
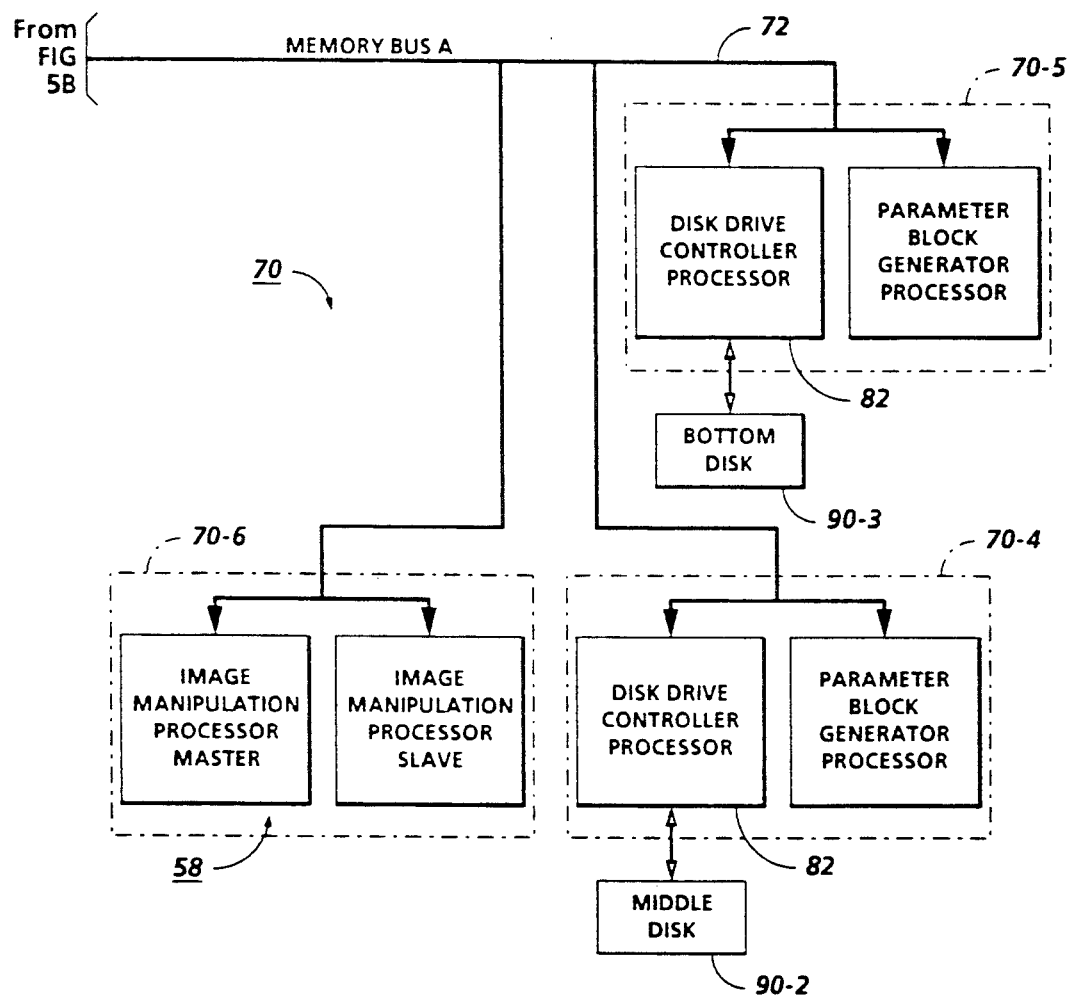

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having a disk drive controller/processors 82 for transmitting data to and from disks 90-1, 90-2, 90-3 respectively of main memory 56 (image compressor/processor 51 for compressing the image data is on PWB 70-3; image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
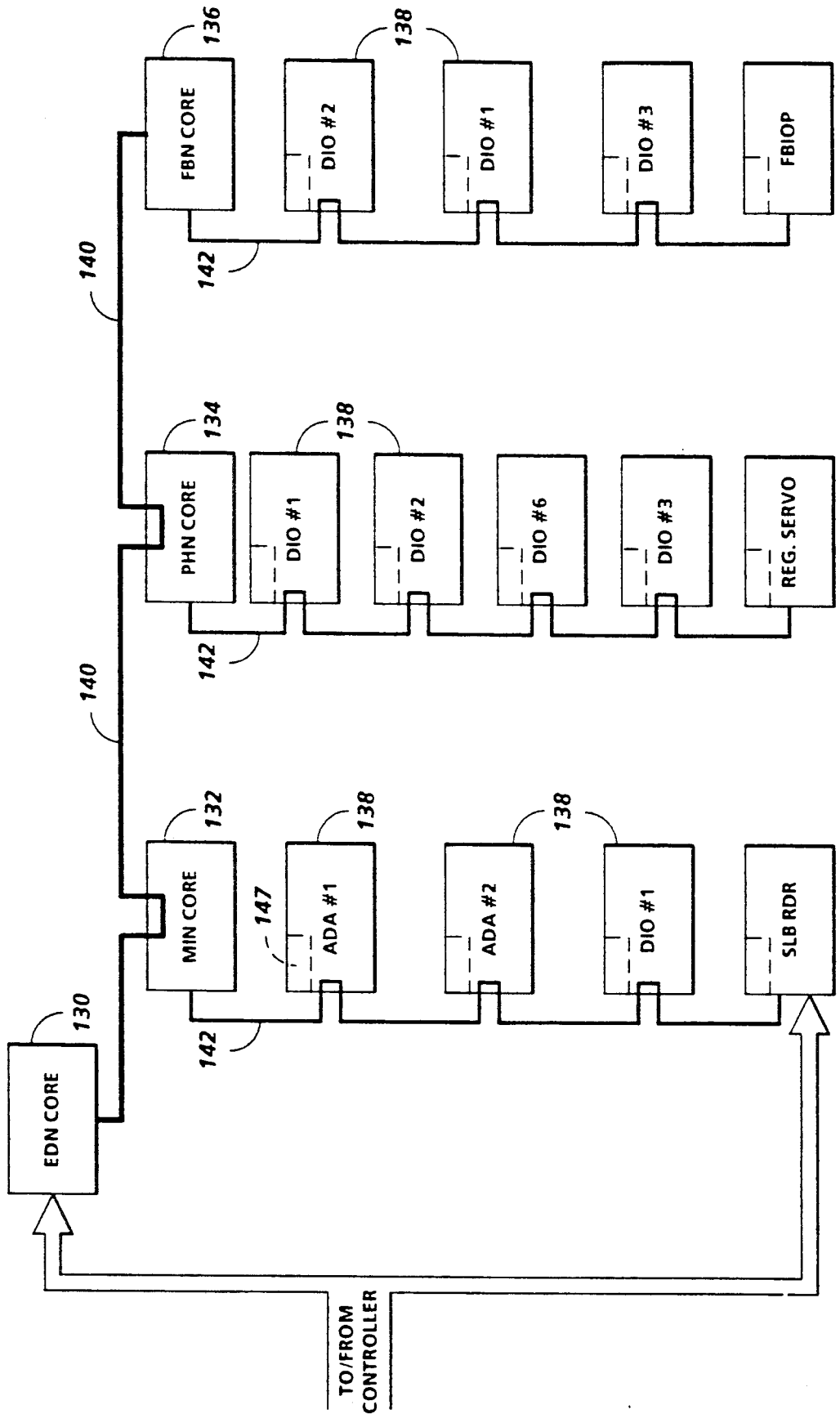
FIG. 6 is a block diagram depicting the Operating System, with Printed Wiring Boards and shared line connections.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

Referring to FIG. 8, programming of the covers options desired for a particular output job is accomplished by selecting the desired options from the cover options job ticket 160 which is displayed when the user selects cover tab 154 of FIG. 7. Within the cover options job ticket, the user has the option to select one of five covers configurations by selecting the representative cover icon. The first, and also the default, option is no covers, as represented by icon 162. Front or back covers only are represented by icons 164 and 166, respectively. Icon 168 represents the selection of both front and back covers, where the subsequent cover programming applies to both the front and back covers, and icon 170 is representative of the selection wherein the front and back covers are intended to have unique characteristics. The intent of the cover options job ticket is to facilitate the user selection of a cover option. Assuming the user wishes to add cover sheets to the output documents, he or she would select one of the four cover options icons, 164, 166, 168 or 170. Upon doing so a second programming screen, illustrated by FIG. 9, will be displayed to the user on UI 52 of FIG. 1. Additionally, once covers have been programmed, the screen of FIG. 8 will not be presented unless and until covers are deselected at some subsequent time.

Figure 9:
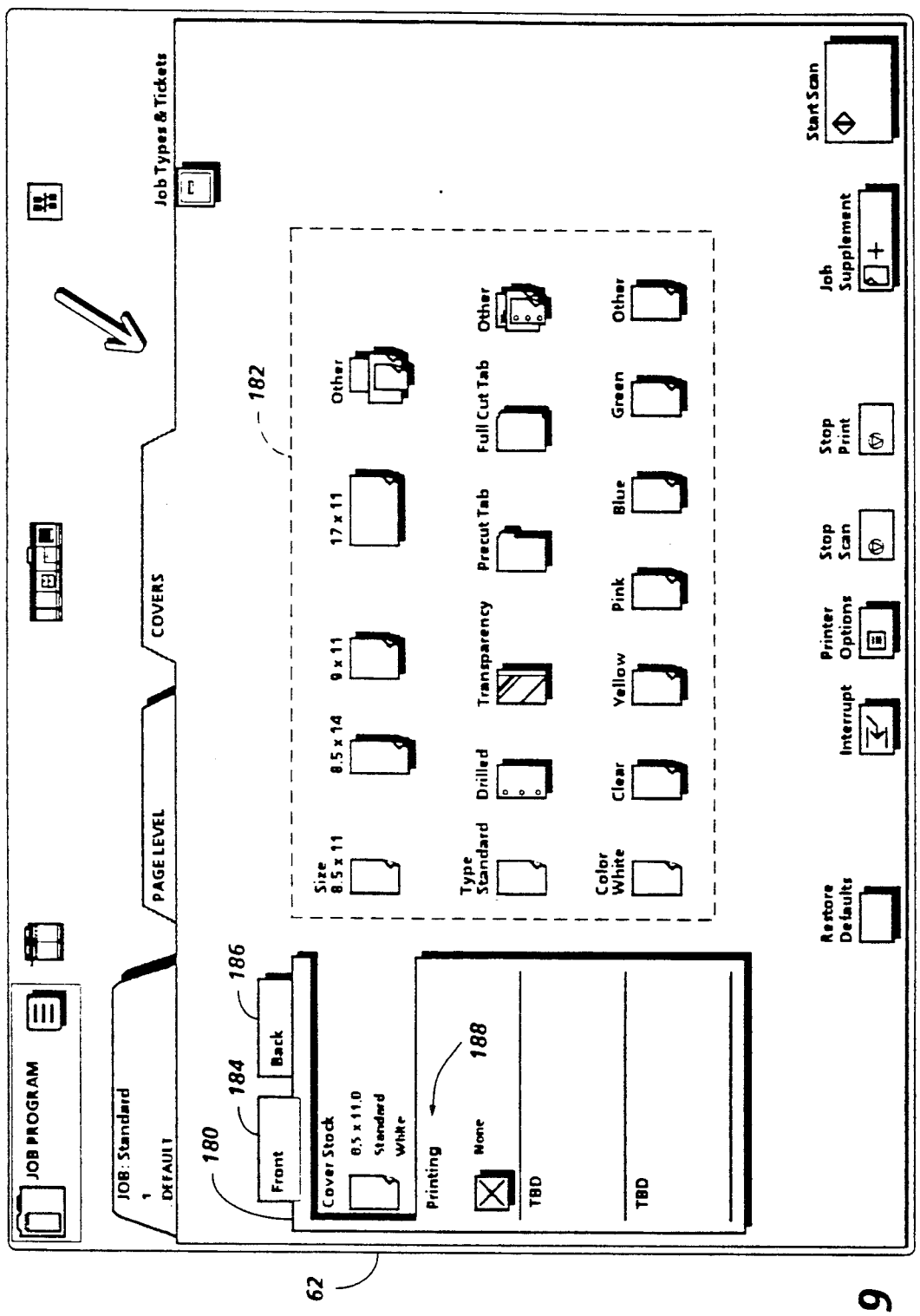
FIG. 9 is a view of the User Interface touchscreen display in the Covers programming mode displaying examples of the cover stock options within the Job Ticket region.

Referring now to FIG. 9, which illustrates the cover sheet stock and printing selections, Covers Job Scorecard 180 represents the current programming selections for the front cover sheet, having a standard white sheet stock selection and no printing on the cover, both of which are the default cover sheet selections. From Covers Job Scorecard 180, it is possible to select the Front Cover Tab 184 or the Back Cover Tab 186 in order to display the appropriate, front or back cover sheet Cover Job Ticket 182. As illustrated in FIG. 9, Cover Job Ticket 182 is representative of the settings for the cover stock selection of the front cover sheet. Alternatively, depressing Back Cover Tab 186 would result in the display of the cover stock selections associated with the back cover sheet.

Figure 10:
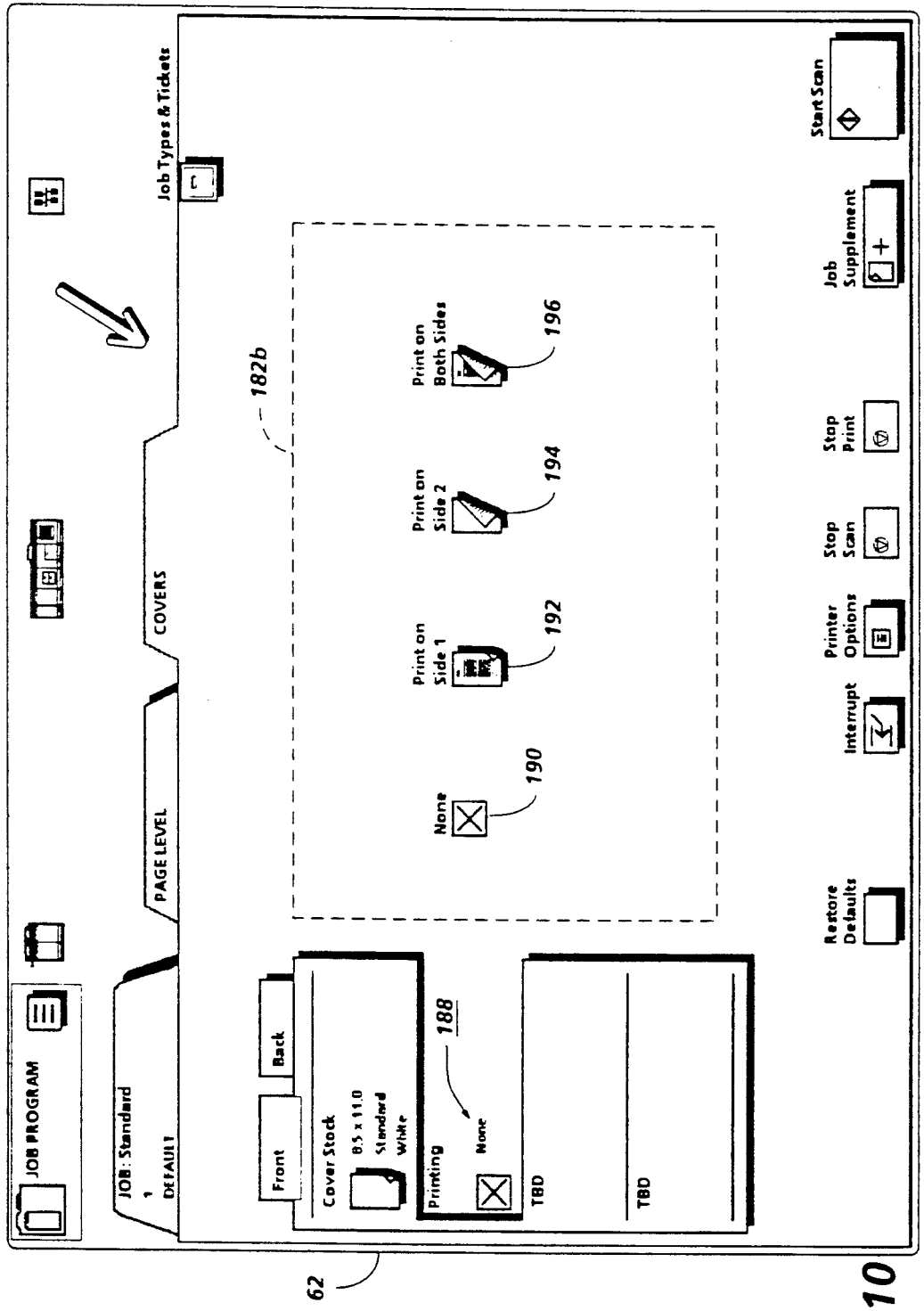
FIG. 10 is a view of the User Interface touchscreen display in the Covers programming mode displaying examples of the printing options within the Job Ticket region.

In addition, Cover Job Scorecard 180 also allows the user to alter the information displayed within the job ticket. For example, if the user were to select Printing icon 188, within Cover Job Scorecard 180, the Cover Job Ticket area would be updated to display the options portrayed in area 182b, of FIG. 10. Referring also to FIG. 10, area 182b represents the currently programmed selections for the printing of images on the front cover sheet. As indicated by the icons within Cover Job Ticket 182b, the user may select one of four possible cover printing options. The options include no printing, icon 190, printing on the front of the cover sheet, icon 192, printing on the back of the cover sheet, icon 194, and printing on both sides of the cover sheet, icon 196. Furthermore, any of these printing options may be selected for the front and/or back covers, independent of the plex (sides imaged) of the input or output documents. For example, a simplex input document, such as that represented by FIG. 12A, may be reproduced with a duplexed front cover, a duplexed back cover and simplex pages in between the front and back covers as illustrated in FIG. 12D.

Figure 11A:
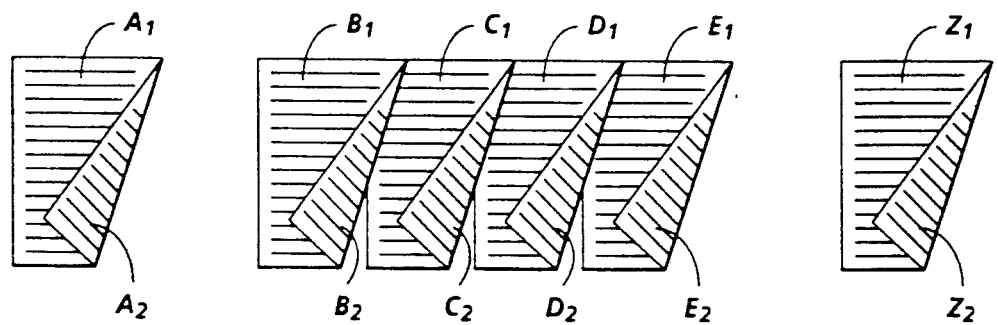
FIG. 11A illustrates a typical set of duplex input documents to be reproduced in accordance with the present invention by the printing system of FIG. 4.
Figure 11B:
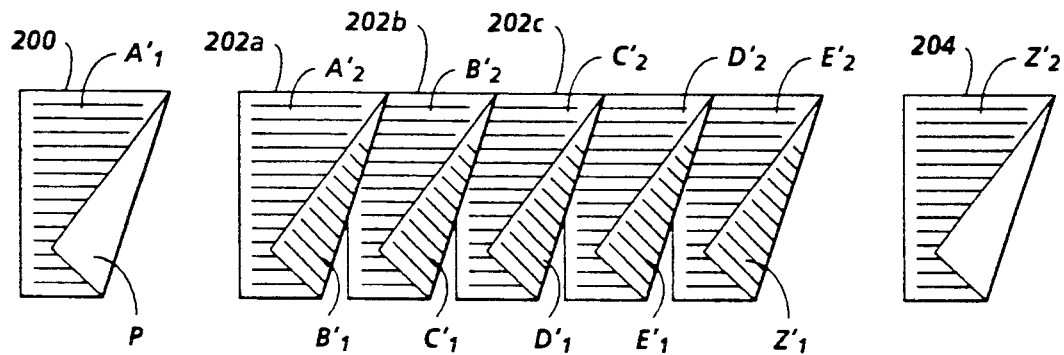
FIGS. 11B-11D comprise three examples of output documents, including cover sheets, that might be produced from the input documents of FIG. 11A.

Referring now to FIGS. 11A and 11B, where FIG. 11A represents an original duplex input document and FIG. 11B represents a possible configuration of the output printing job, the input document, FIG. 11A contains six duplex input pages denoted A,B,C,D,E and Z. Moreover, each of the duplex original documents has two image sides per sheet, denoted by the subscripts 1 and 2, thereby generating a total of twelve original images which are stored in main memory 56 of FIG. 2, when the originals are scanned by scanner section 6 of FIG. 1.

Figure 13:
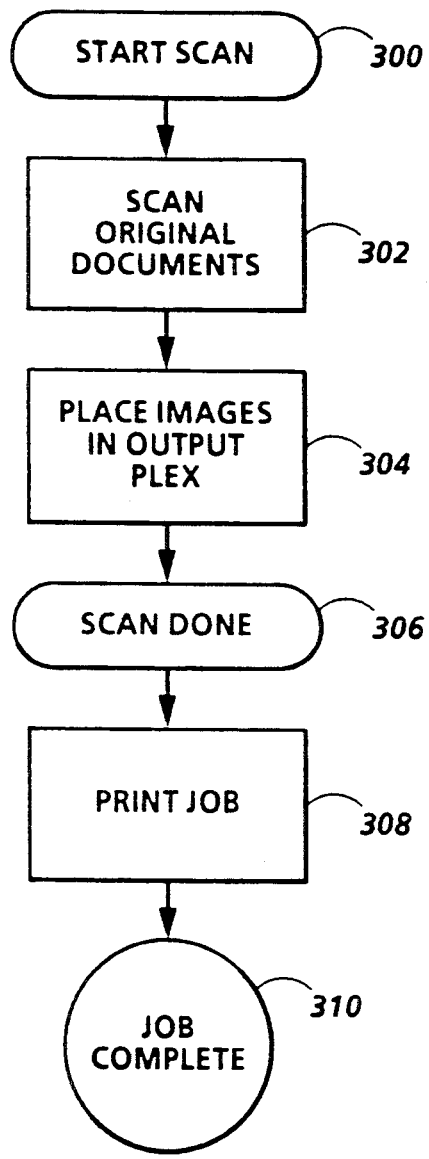
FIG. 13 depicts the automated steps executed by the printing system of FIG. 1 during the reproduction of a set of original documents.

Referring briefly to FIG. 13, which depicts the automatic machine operations associated with the reproduction of a set of original documents, the user first starts the reproduction job by initiating the scanning operation, Start Scan, block 300. After StartScan, scanner section 6 of FIG. 1 successively scans all sides of the duplex input documents of FIG. 11A, block 302, and places the images of these documents into the appropriate output order, block 304. Subsequently, the system controller executes a ScanDone procedure indicated by block 306 to reorder the pages within main memory as appropriate for the programmed cover features. Finally, the system controller moves the reordered job into the printing queue, block 308, to facilitate output by printer section 8 of FIG. 1, whereby the job will be completed, block 310.

Referring again to FIGS. 11A and 11B, the images denoted in FIG. 11A as $A_1$, $A_2$, $B_1$, ..., $Z_1$, $Z_2$. FIG. 11B represents the output of the images $A_1$, $A_2$, $B_1$, ..., $Z_1$, $Z_2$ in an output job having front and rear covers 200 and 204 respectively, which are to be printed on the front side only and 204 respectively, which are to be printed on the front side only and intervening pages 202 which are to be duplexed. More specifically, the first image ($A_1'$) is placed on the front of front cover 200, and no image is placed on the rear of front cover 200. Blank image P is inserted into the string of pages contained in main memory in order to assure that image $A_2'$ will be printed on the front of the first intervening page, 202a. In addition, the remaining original images, $A_2'$, $B_1'$, ..., $Z_1'$, $Z_2'$ must be shifted to the right to make room for blank image P immediately after image $A_1'$ in the image string. Subsequently, the remaining intervening sheets and rear cover may be printed with the images, $B_1'$, $B_2'$, ..., $Z_1'$, $Z_2'$, contained sequentially in main memory.

Figure 11C:
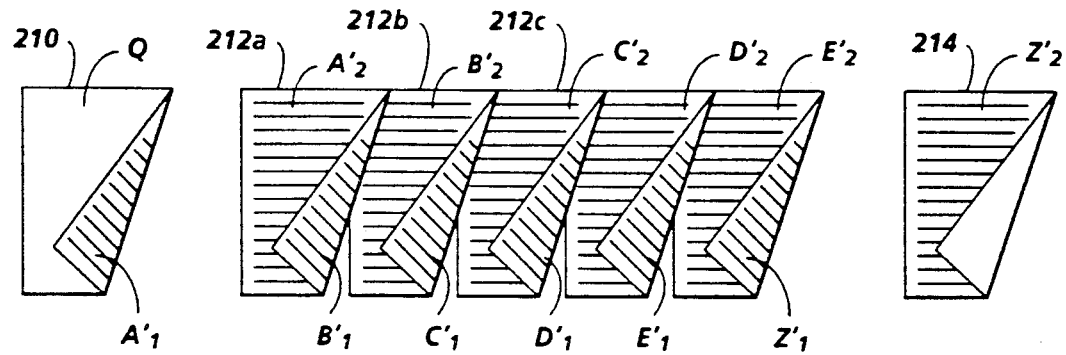

Referring to FIG. 11C, which represents another possible configuration of the output printing job in accordance with the present invention, the output document has a front cover 210 which is to be printed on the rear side only, a rear cover 214 which is to be printed on the front side only and intervening sheets 212 which are to be printed in duplexed fashion. In this output situation, because front cover sheet 210 is to be blank on the front, a blank image Q must be inserted at the beginning of the string of stored images so that the front cover sheet will be output in accordance with the duplex mode selected for the remainder of the job. Moreover, the remaining original images, $A_1'$, $A_2'$, $B_1'$, ..., $Z_1'$, $Z_2'$ must be shifted to the right to make room for blank image Q at the head of the image (job) string.

Figure 11D:
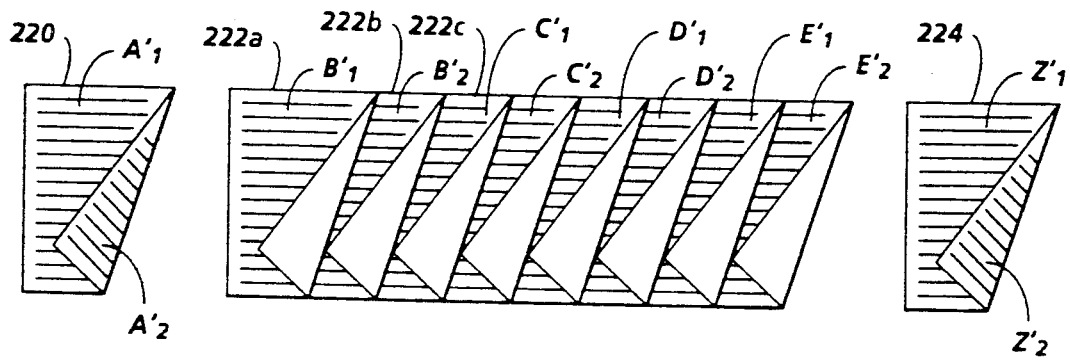

Referring now to FIG. 11D, which represents yet another possible configuration of the output printing job in accordance with the present invention, the output document has front and back covers, 220 and 224 respectively, which are to be printed in duplex fashion and intervening pages 222 which are to be printed in simplex fashion. After scanning this job, the stored images are arranged in memory in the correct order, one image per output page. Therefore, in order to print a front cover in duplex fashion, the image of the second page, $A_2'$, must be placed on the back of the first or front cover sheet 210. Moving the page generates a blank second page in the string of pages contained in memory, requiring the deletion of the blank second page in order to avoid output of a blank sheet immediately following the cover sheet. Similarly, the back cover images are composed by taking the last image in the job string, $Z_2'$, and moving it to the back side of the last or back cover sheet 224 and taking the previous page image, $Z_1'$, and moving it to the front side of cover sheet 224. Once again, moving of the previous page image, $Z_1'$, results in a blank second-to-last page, immediately preceding the cover sheet, that must be deleted to avoid output of a blank copy sheet.

Figure 12A:
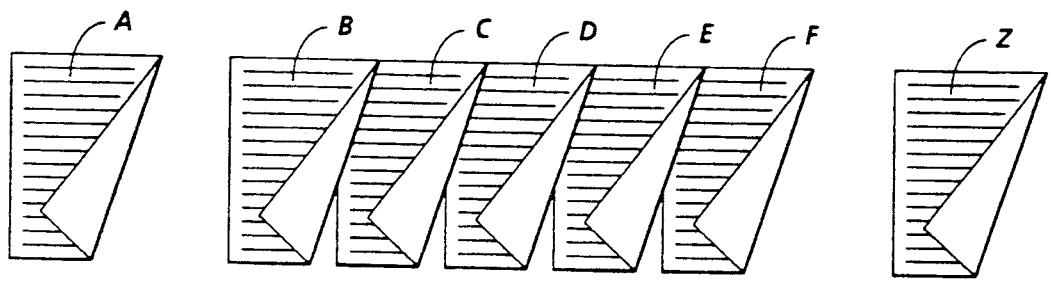
FIG. 12A illustrates a typical set of simplex input documents to be reproduced in accordance with the present invention by the printing system of FIG. 1.
Figure 12B:
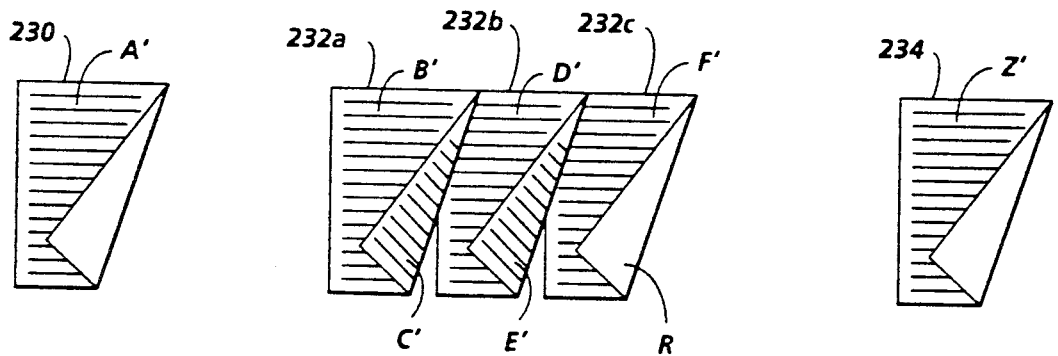
FIGS. 12B-12D comprise three examples of output documents, including cover sheets, that might be produced from the input documents of FIG. 12A.

Referring now to FIGS. 12A and 12B, where FIG. 12A represents an original simplex input document and FIG. 11B represents a possible configuration of the output printing job, the input document FIG. 12a contains seven simplex input pages denoted A,B,C,D, E,F and Z, thereby generating a total of seven original images, which are stored in main memory 56 of FIG. 2, when the originals are scanned by scanner section 6 of FIG. 1.

FIG. 12B represents the output page configuration for the input images A,B,C, ..., Z in an output job having front and rear covers 230 and 234 respectively, which are to be printed on the front side only and intervening pages 232 which are to be printed in a duplex fashion. Subsequent to scanning the original document, the images are stored in a job string representative of a duplex output stream. Therefore, in order to print front cover 230 with an image on the front side only, images B' through Z' must be shifted to the right by 1, thereby creating a blank side on the back of the first output sheet, front cover 230. In addition, a page must be added to the end of the image string in order to move image Z' from the present location on the back side of the second to last sheet to the front side of back cover 234, thereby creating blank side R on the third intervening sheet 232c.

Figure 12C:
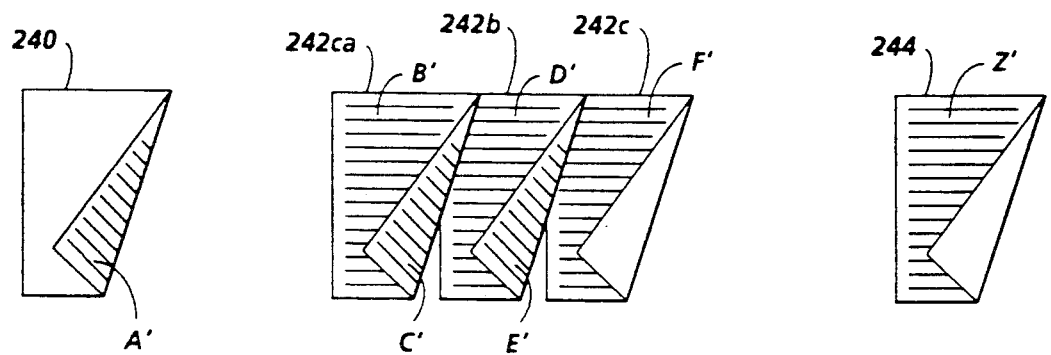
Figure 12D:
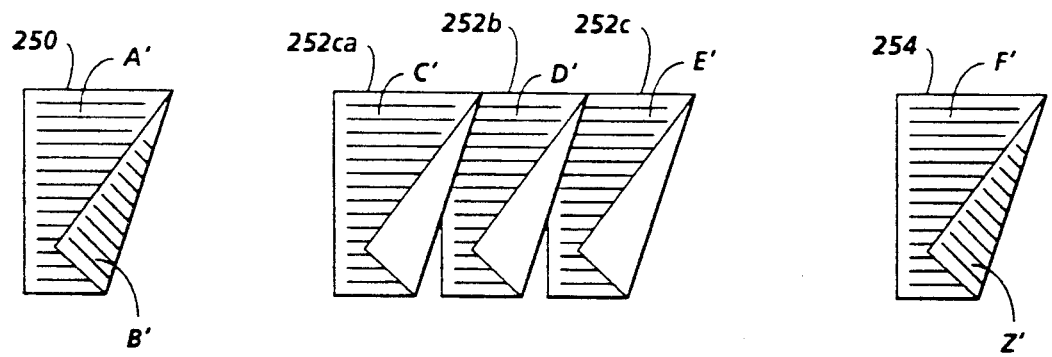

Referring now to FIG. 12C, which depicts another possible configuration of the output printing job in accordance with the present invention, the output document has a front cover 240 which is to be printed on the rear side only, a rear cover 244 which is to be printed on the front side only and intervening sheets 242 which are to be printed in duplexed fashion. After scanning, the images contained in memory are shifted right by one image position to accommodate the blank front side of front cover 240, resulting in image A' on the back of the first output sheet and sheets B' through Z' filling out the remaining six sides of the three intervening duplex sheets. Next, in order to print image Z' in the front face of back cover 244, a page must be added to the end of the job and image Z' must be moved from the rear of the now second-to-last page, 242c, to the front of back cover 244 as shown.

Referring now to FIG. 12D, which depicts yet another possible configuration of the output printing job associated with the input documents of FIG. 12A, the desired output document having front and back covers, 250 and 254 respectively, which are to be printed in duplex fashion and intervening pages 252 which are to be printed in simplex fashion. As previously described, the images are placed in sequential order in memory during scanning. Subsequently, the second scanned image, B', is moved to the rear side of the first sheet, cover sheet 250, and the page on which B' was positioned is now blank and will be deleted. Composition of the last or back cover sheet 254 is accomplished by moving the image on the front of the last sheet, Z', to the rear of the sheet, moving the image, F', from the front of the previous sheet to the front of last sheet 254 and deleting the now blank previous sheet from memory, thereby resulting in the page configuration illustrated.

Figure 14A:
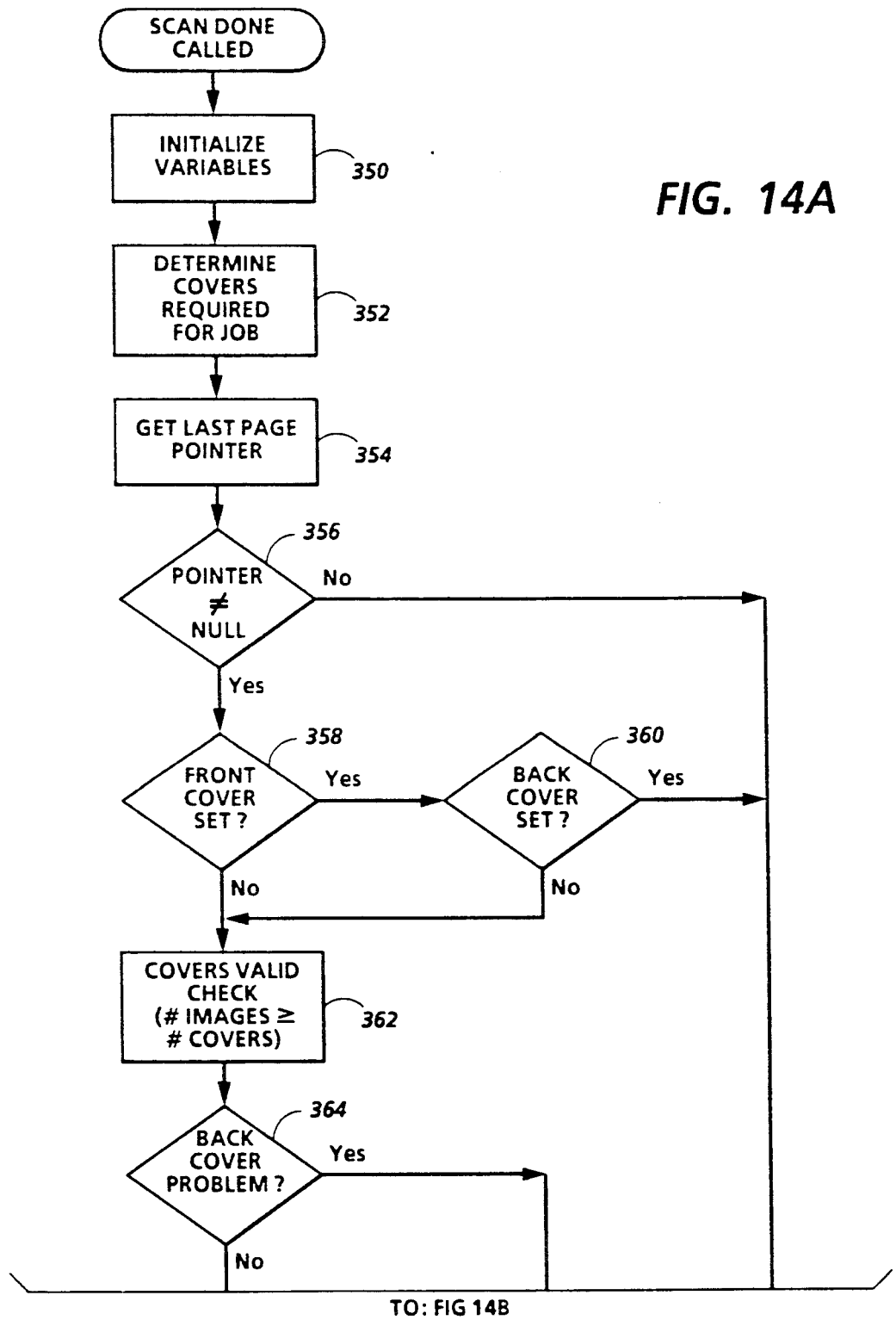
FIGS. 14A-14B depict a flowchart illustrating the various operations and procedure calls of the ScanDone procedure of the present invention.
Figure 14B:
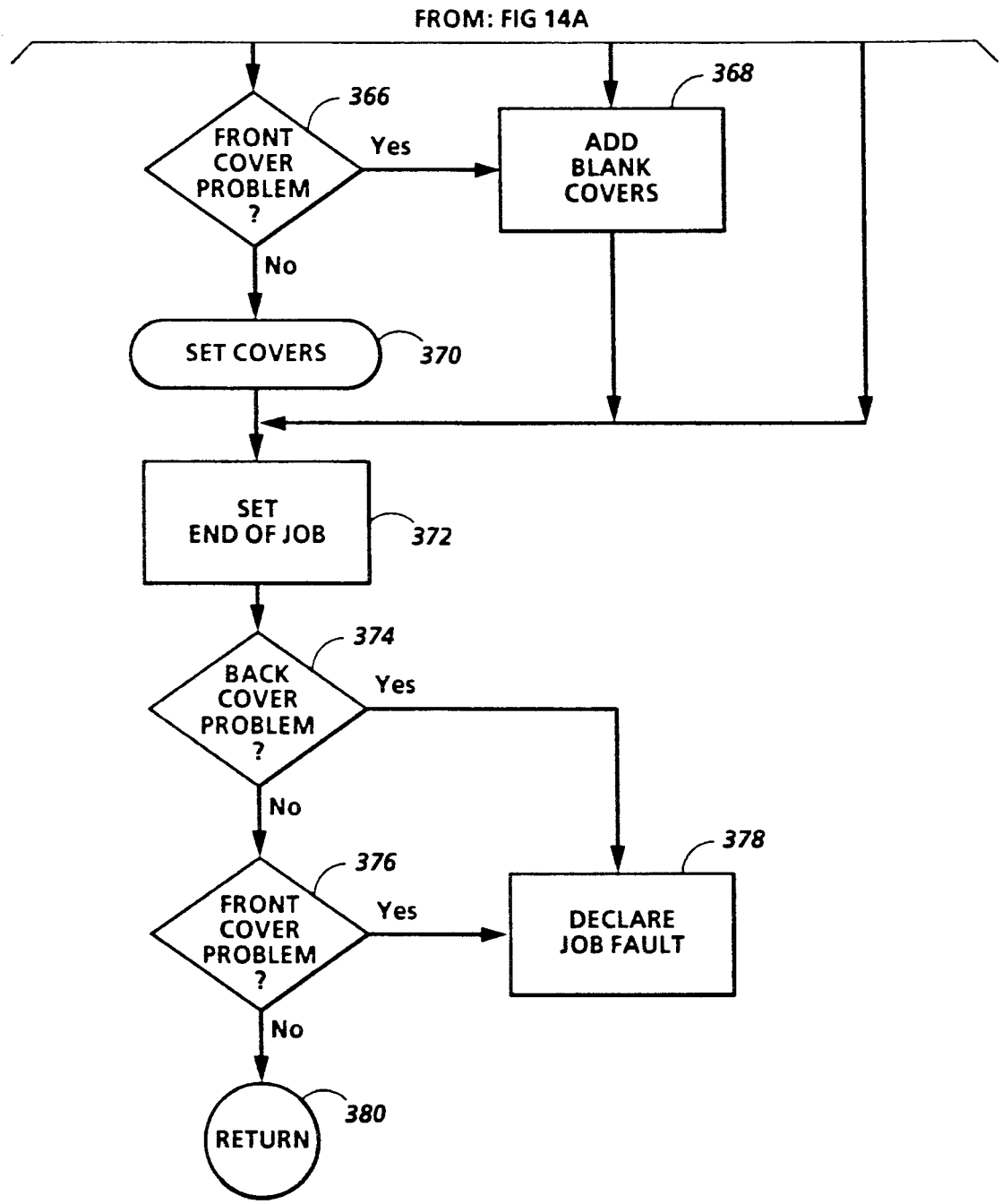

Briefly, FIG. 13 depicts the automated steps associated with the reproduction of a set of original documents, while the aforedescribed examples of various cover sheet printing configurations is accomplished by the ScanDone procedure call at block 306. Referring now to FIG. 14, which is a detailed illustration of the steps associated with the ScanDone procedure designed to complete any image and page ordering required prior sending the job into the printing queue, block 308 of FIG. 13. The procedure begins by initializing local parameters and variables, block 350, before retrieving the indication of whether covers are required for the job, block 352. Next, a last page pointer is initialized to point to the last page of the job, block 354, and is immediately tested at decision block 356 to determine if is a null pointer, indicating that there are no pages in the job. If pages are in the job, processing continues at decision blocks 358 and 360, which effectively represent a test to assure that both covers have not previously been set. If both covers have already been set, no further ordering is required and the job is ready for printing. However, if both covers have not been set, a procedure is called to execute a check to determine if the cover settings are valid, block 362. The values returned from the procedure are checked to determine if a problem exists with either the front or back covers, decision blocks 364 and 366 respectively. More specifically, the tests executed are designed to assure that an appropriate number of input images have been scanned to provide sufficient images for the generation of the covers as programmed. Should this not be the case, a set of blank covers will be automatically added to the set, block 368, and the SetCovers procedure of block 370 is skipped.

The SetCovers procedure of block 370 is designed to automatically adjust the image and page ordering of the input job to facilitate the production of the job with the cover selection previously programmed. Further details of the SetCovers procedure are discussed with reference to FIG. 15. Subsequent to setting the covers for the job, block 370, the job is complete, a status indicated by updating a job database, block 372, used to record the status of all jobs in progress. Subsequent to scanning, the progress of the job is maintained in a database, contained in main memory, which is updated upon completion of each phase of the job as it passes through the system. Subsequent to setting the end of job status and indicating that the reordering process has been completed, an additional test is executed, decision blocks 374 and 376, to detect if an error was detected with either the front or back cover selection. Should this be the case, the job will not be passed to the printing queue, but will be passed to a faulted job list or queue where the fault condition may be corrected by user intervention as represented by block 378 thereby allowing subsequent printing of the job. Finally, control is passed back to the calling procedure at return block 380.

Referring now to FIG. 15, which illustrates the structure of the SetCovers procedure as first described in procedure block 370 of FIG. 14, immediately after being called the SetCovers procedure retrieves the parameters passed by the ScanDone procedure, block 400. Next, the procedure executes a case statement, represented graphically by a series of four decision blocks, 402, 404, 406, and 408, which determine the cover printing settings programmed by the user utilizing the programming screen illustrated in FIG. 10. If the programmed covers selection was NONE, as tested in decision block 402, processing continues at block 416, where the database is updated and control is returned to the calling procedure. If however, FRONT, BACK, or BOTH covers have been selected, as detected by decision blocks 404, 406 and 408 respectively, additional procedures are called to control the automatic manipulation of the images and pages. Specifically, the additional procedures include the SetFrontCoversInternal procedure, procedure block 412 and the SetBackCovers procedure at procedure block 414. Subsequent to executing the front and/or back cover procedure calls, control is returned so that the database may be updated at block 416 and the SetCovers procedure may return control to the calling module, block 418.

Figure 16A:
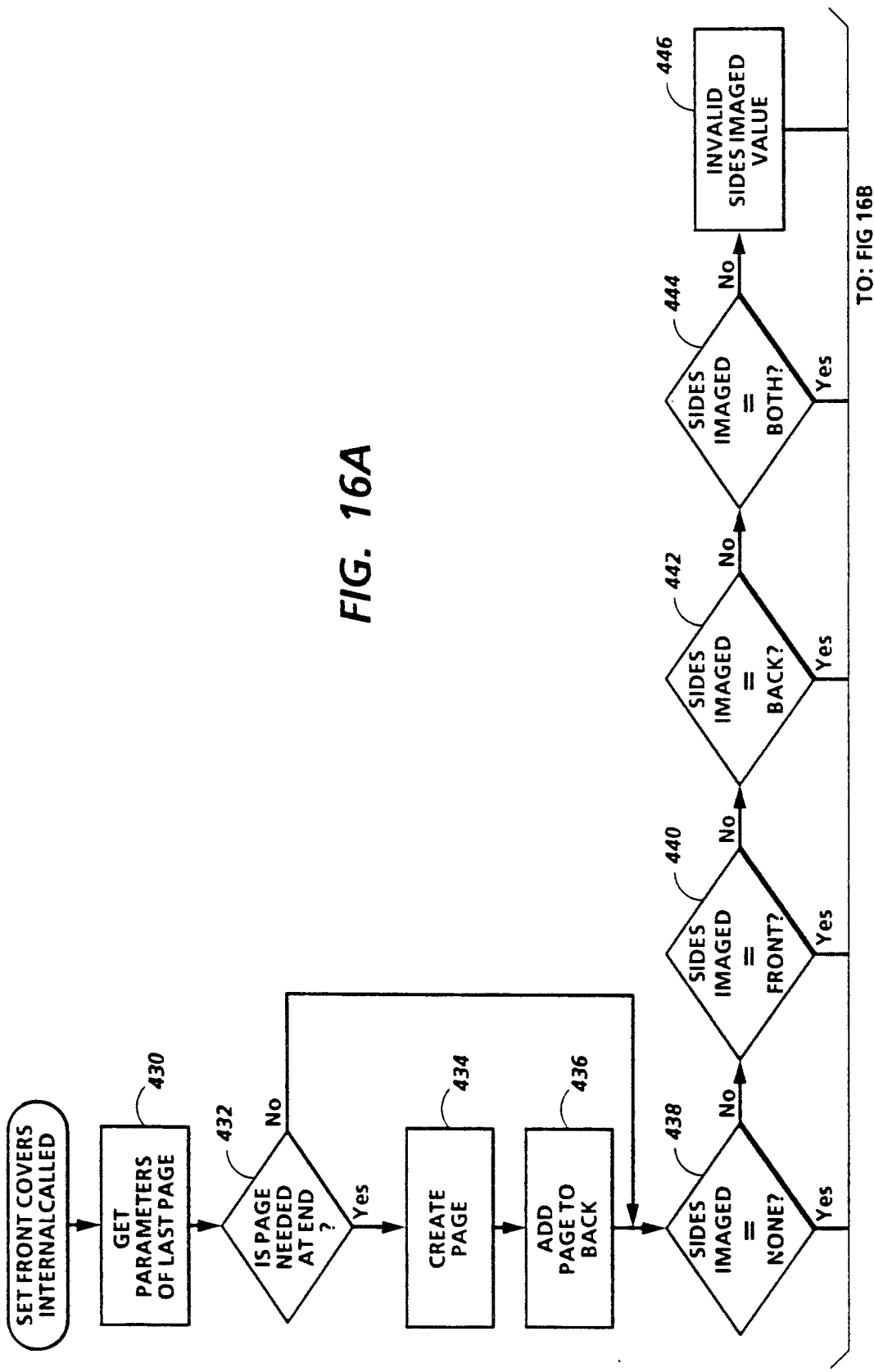
FIGS. 16A-16B depict a flowchart illustrating the various operations and procedure calls of the SetFrontCoversInternal procedure of the present invention.
Figure 16B:
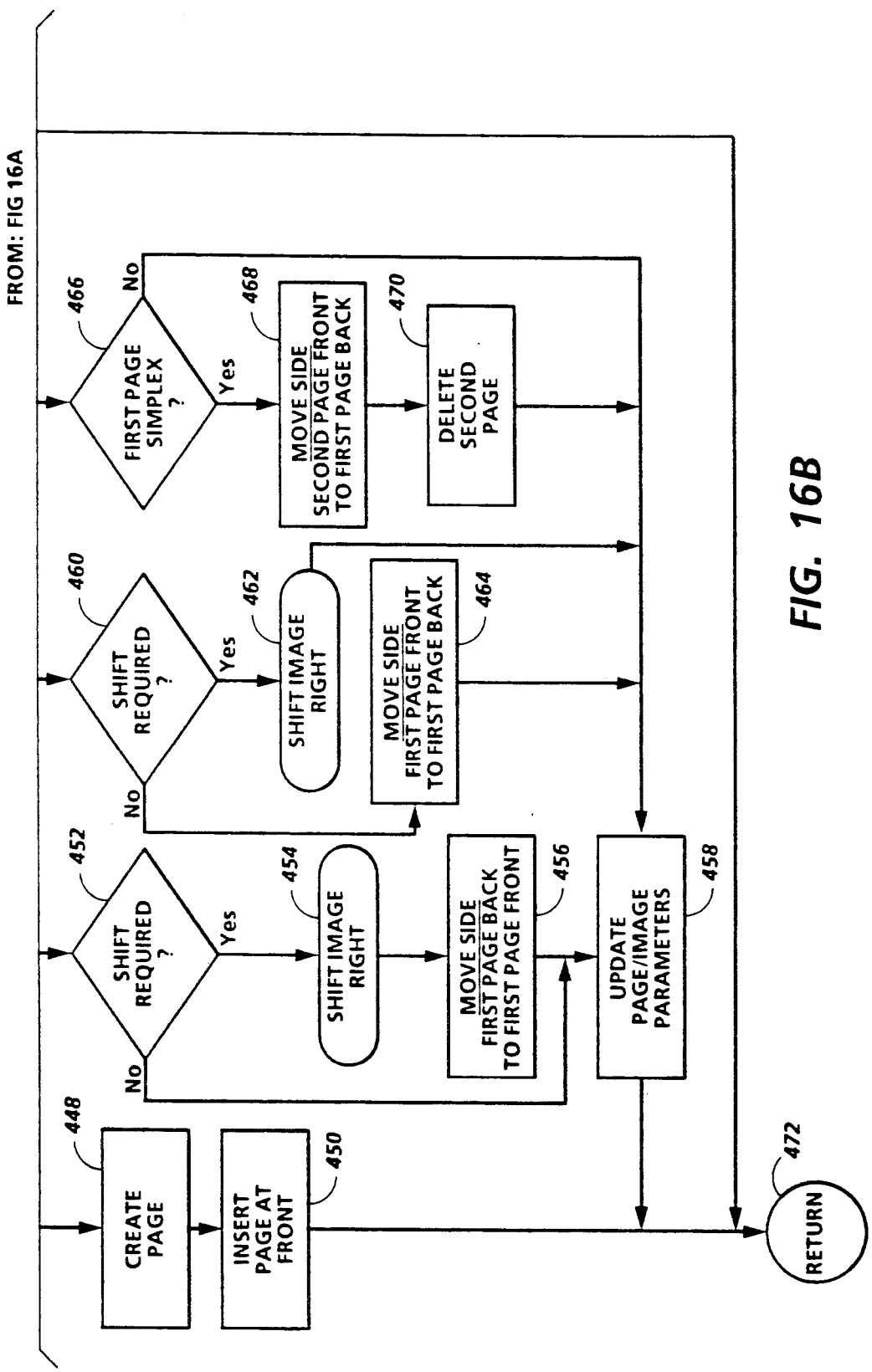

Referring now to FIG. 16, which depicts the processing associated with the aforementioned SetFrontCoversInternal procedure in accordance with the present invention, initially the procedure retrieves a pointer to the last image page of the job and gets the parameters associated with the last page, block 430. Subsequently, the procedure executes an elaborate IF statement, based upon the current page and image configuration, to determine if there is a need for an additional page at the end of the current job string, decision block 432. If so, block 434 creates an additional page, giving it the same characteristics as the present last page and then adds it to the end of the string to become the new last page of the job string, block 436.

Having adjusted the end of the job string, the procedure then executes a case statement based on the number of sides of the front cover that will contain images, in order to determine what additional reordering of images and pages is necessary. The case statement executed is represented graphically by a series of four decision blocks, 438, 440, 442, 444 and a default case block 446 that detects an invalid setting for the sidesImaged variable and declares a system error if detected.

If no sides of the front cover are to have images, as detected by decision block 438, a blank page will be created, block 448, and inserted at the front of the job string, block 450. Doing so will create a page blank on both sides, suitable for producing a cover with no printing. If the front side of the cover is selected for printing, the procedure executes a test, decision block 452, to determine if the images must be shifted towards the end of the job string by one image. This test returns an affirmative response when the output job is a duplex printing job and is the same as the example previously described with respect to generation of front cover 200 of FIG. 11B. If a shift is required, the images are shifted to the right, procedure block 454, by a call to the ShiftImagesRight procedure. Generally, the ShiftImagesRight procedure starts with the last image in the job string and shifts it one page side to the right, possibly onto a page added at block 436. The procedure then continues by shifting the remaining images to the blank page side created by the previous shift, until all images have been shifted, thereby temporarily creating a blank first page. Finally, the front cover reordering is completed by moving the image from the back of the first or front cover sheet to the front of the sheet, via the MoveSide procedure of block 456, thereby putting an image on the front of the front cover and causing a blank output for the back of the front cover. Alternatively, had the test in decision block been false, indicating that the job string was already in a simplex output mode, no further processing would be needed to produce a front cover with an image on the front side only.

The third alternative of the case statement, represented by decision block 442, is one in which only the back side of the front cover is to have a printed image, as illustrated in the example output of FIG. 11C and 12C. Initially, decision block 460 tests if an image shift is required to produce a blank page side at the front of the document. In the case of a duplex output document, such a shift would be required and therefore would be executed at procedure block 462. In this situation however, no further manipulation of the images would be required, as the duplex document would now have a first sheet with an image on the rear face only. Should the intended output, and therefore the job string, be in simplex mode, a negative response at decision block 460 will cause the MoveSide procedure at block 464 to move the image on the front face of the first sheet to the rear face of the sheet, thereagain resulting in the desired output.

The final valid alternative in the case statement is a situation where the front cover is to have images printed on both sides, as represented by the output examples shown in FIGS. 11D and 12D. After determining that the front cover is to be duplexed, the procedure executes a test, decision block 466, to determine if the job string is currently in a simplex mode. If so, indicated by a positive response from decision block 466, the image on the front of the second simplex page must be moved to the rear of the first page to produce a duplexed first sheet, procedure block 468. Next, because a blank sheet is created by moving the image of the second page, the second page is deleted at block 470.

Finally, after adjusting the pages as required by the addition of front covers as programmed, the page and image parameters for the job are updated to reflect the current job string configuration, block 458. Subsequently, control is returned to the calling procedure, block 472, to facilitate additional reordering associated with the back cover or forwarding of the job to the printing queue.

Figure 17A:
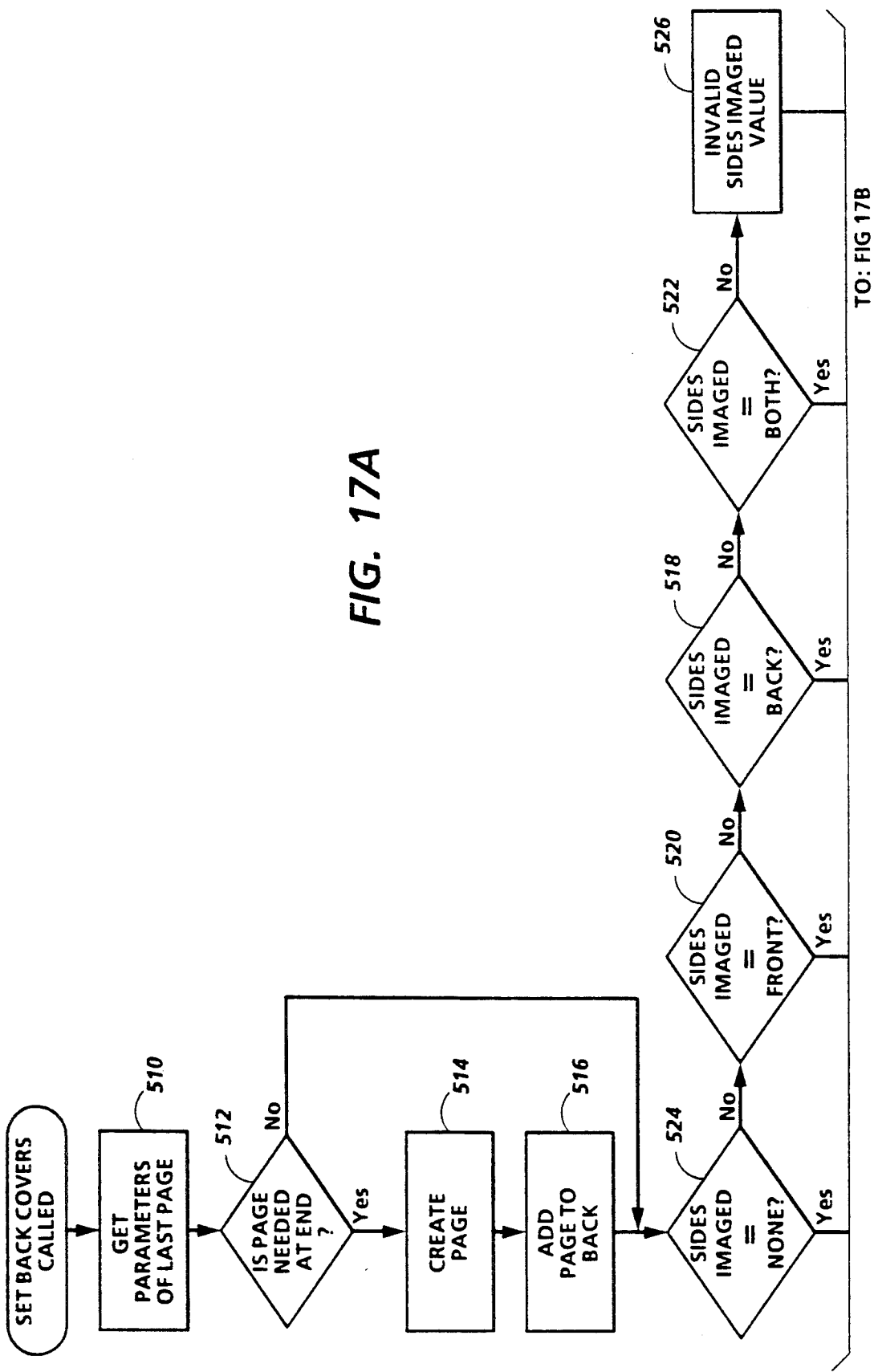
FIGS. 17A-17C depict a flowchart illustrating the various operations and procedure calls of the SetBackCovers procedure of the present invention.
Figure 17B:
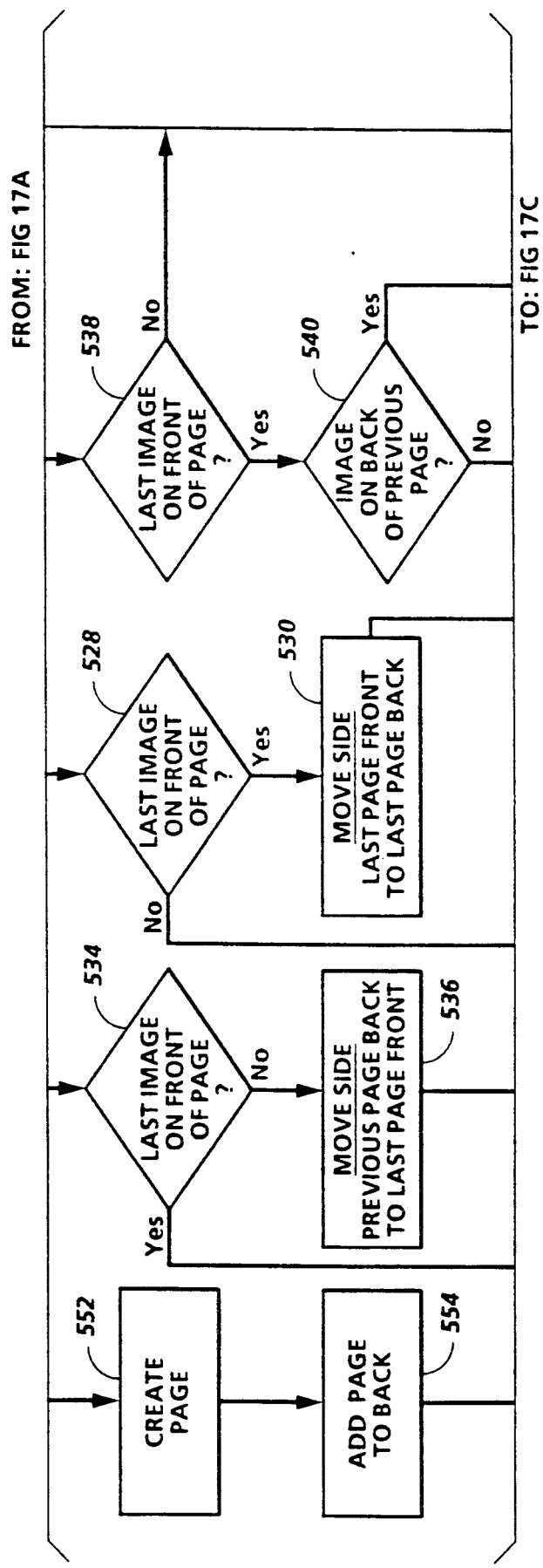
Figure 17C:
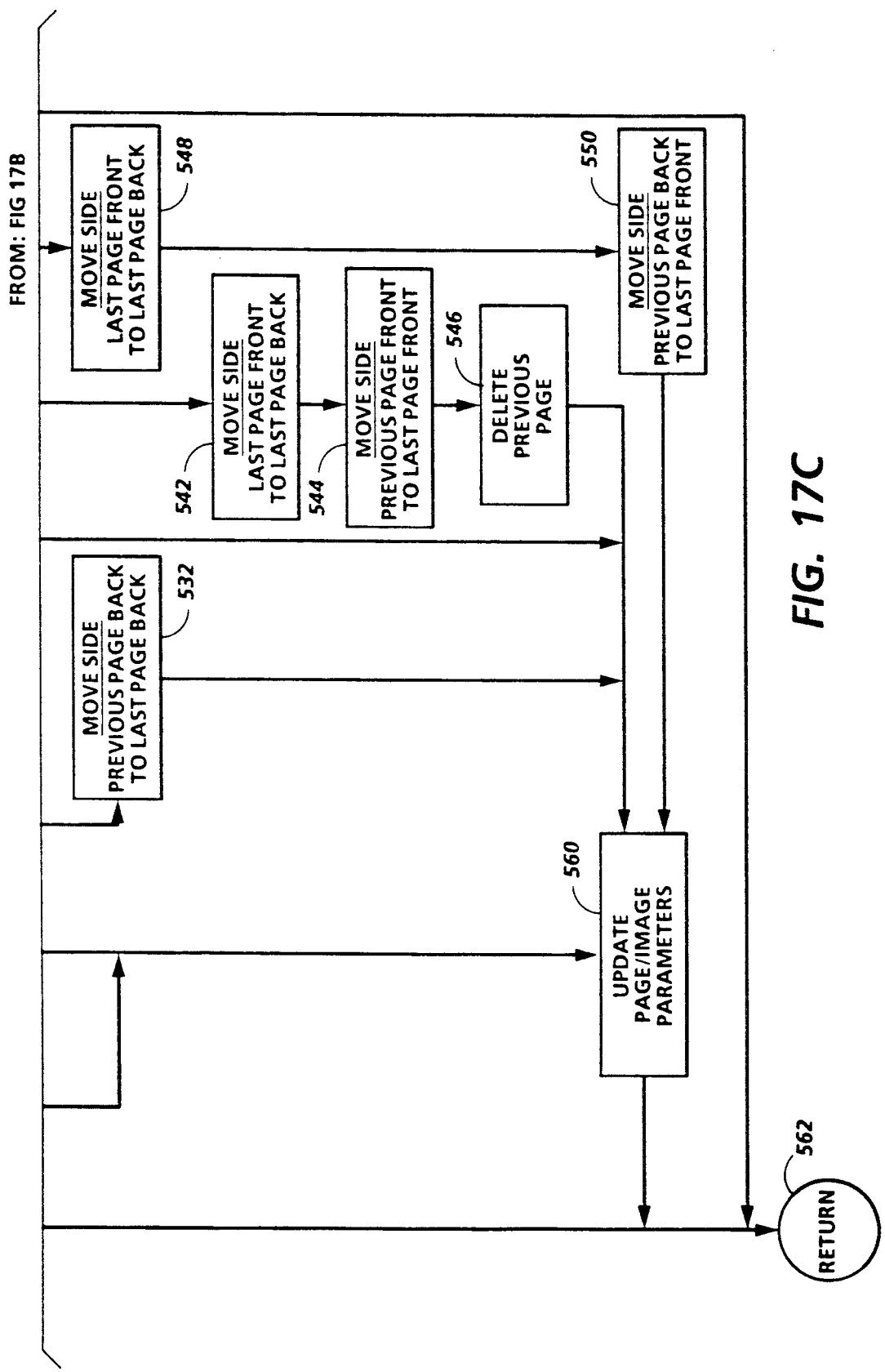

Referring now to FIG. 17, which depicts the processing steps associated with the SetBackCovers procedure in accordance with the present invention, initially the procedure retrieves a pointer to the last image page of the job and gets the parameters associated with the last page, block 510. Subsequently, the procedure executes an elaborate IF statement, based upon the current page and image configuration, to determine if there is a need for an additional page at the end of the current job image string, decision block 512. If so, block 514 creates an additional page, giving it the same characteristics as the present last page and then adds it to the end of the string to become the new last page of the job string, block 516.

Having adjusted the end of the job string, the procedure then executes a case statement based on the number of sides of the back cover that will contain images, in order to determine what additional reordering of images and pages is required. The case statement executed is represented graphically by a series of four decision blocks, 518, 520, 522, 524 and a default case block 526 that detects an invalid setting for the sidesImaged variable and declares a system error if detected.

The first test, executed in decision block 518, is a test to determine if the back cover is to have an image printed on the back side only. If so, the procedure next executes a test, decision block 528, to determine if the last image in the job is located on the front side of a page. If the last page has an image, it must be on the front side of the last page and therefore, the MoveSide procedure of procedure block 530 will be called to transfer the image from the front side of the last page to the rear of the last page. Alternatively, procedure block 532 will transfer the image from the rear of the previous page to the rear of the last page or back cover sheet, thereby creating a back cover with an image on the back side only and a second-to-last page with an image on the front side only.

If the back selection was programmed for printing on the front side only as previously described with respect to the output examples of FIGS. 11B and 11C and as detected by decision block 520, the system would again check to determine if the last image is on the front side of the page, decision block 534. If so, the images are in their correct location and there is no need to move any of the images. If not, however, the image on the back of the previous, or second to last page, must be moved to the front of the last page or cover sheet, as programmed. This move is accomplished by the MoveSide procedure in procedure block 536.

The third alternative in the case statement, represented by decision block 522 is the situation where both sides of the back cover are to have images printed thereon, as depicted in FIGS. 11D and 12D. After determining that the back cover is to be a duplex image cover, decision block 522, the system next tests to determine if the last image is on the front of a page. If not, then the last image must be on the back of the last page and the last sheet is, therefore, already in the duplex image mode and no further ordering is required. Should the last image be on the front of a page, as determined by a positive response in decision block 538, decision block 540 next makes the determination of whether an image exists on the back of the previous page. If no image exists on the back of the previous page, the job string has been arranged in simplex image fashion and the duplex back cover must be composed from images from the front of the last two pages. Specifically, procedure block 542 executes a MoveSide operation to transfer the image from the front of the last page to the rear of that page and a subsequent MoveSide operation, procedure block 544, transfers the image from the front of the previous page to the front of that page. After composing the last page in this fashion, the previous or second-to-last page will be blank and, therefore, will be removed in block 546. If, however, an image was present on the reverse side of the last page, as detected in decision block 540, the job would exist in a duplex image mode and the last page would be composed by first transferring the image on the front of the last page to the back of the last page, MoveSide procedure block 548. Second, the image on the back of the previous or second-to-last page would be transferred to the front of the last page, procedure block 550, thereagain resulting in the desired duplex image back cover sheet.

Subsequent to the page reordering operations associated with the first three alternatives for the case statement, the associated page and image parameters for the job must be updated, block 560, in the job database, to assure that the new configuration of the job is correctly reflected in the database. Finally, the fourth alternative in the case statement, decision block 524, is a back cover having no sides imaged. A back cover of this nature is composed simply by creating an additional page for the job, block 552, and adding the additional page to the end of the job string, block 554. Moreover, no additional page parameters need to be updated for the added page operations. After completing the necessary reordering to produce the back covers as programmed by the user, control is returned to the calling procedure at block 562.

From the aforedescribed mode of operation and output examples, it has been demonstrated that the present invention is capable of producing a string of compiled electronic images, suitable for output on a printing system, whereby the document may contain front and/or back cover sheets with printed images thereon. Moreover, it is evident that when utilized in a electronic reprographic system, the present invention enables a greater range of front and back cover options than are generally available in the light-lens or electronic reprographic systems available today. Furthermore, these capabilities are implemented in an automatic fashion, requiring no user intervention in the copying process. In addition, the ease with which the cover options can be programmed and produced minimizes the amount of operator training required to produce output documents with covers and reduces the need for extensive operator training in this area.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. An electronic reprographic system having the capability of producing cover sheets for an output document set, including the ability to allow an operator to select the desired features of the front and/or back cover sheets, comprising:
   a scanner for scanning the original document set, so that an electronic representation of the set of original documents is created and stored within the system;
   means for automatically reordering the electronic images in a manner suitable to produce front and/or back cover sheets in accordance with the desired features; and
   a printer for generating printed output of the reordered electronic images, thereby producing a completed document, including covers.

2. In an electronic reprographic system having the capability to input one-sided or two-sided original documents, the method for controlling the addition of cover sheets to an output set and the printing thereon, comprising the steps of:
   a) indicating whether the original documents are one-sided or two-sided;
   b) selecting the desired number of sides to be imaged for said output set;
   c) optionally programming the system to produce a front cover sheet for the output set, including selection of the sides of said front cover sheet to be imaged;
   d) optionally programming the system to produce a back cover sheet for the output set, including selection of the sides of said back cover sheet to be imaged;
   e) scanning the original documents that comprise said job, so as to produce an equivalent electronic page for each of said documents;
   f) organizing said equivalent electronic pages in the order in which said job has been programmed for printing;
   g) printing said front cover sheet in the manner programmed, if a front cover sheet has been selected in step c;
   h) printing the non-cover sheets of said output set in accordance with said desired number of sides to be imaged; and
   i) printing said back cover sheet in the manner programmed, if a back cover sheet has been selected in step d.

3. An electronic reprographic system having the capability of producing cover sheets for an output document set, comprising:
   means, responsive to an operator's selection, for indicating whether the original are one-sided or two-sided;
   means for selecting the desired number of sides to be imaged for said output document set;
   means, alterable by said operator, for programming a set of front cover parameters, so that the system will produce a front cover sheet for the output document set in accordance with said front cover parameters;

means, alterable by said operator, for programming a set of back cover parameters, so that the system will produce a back cover sheet for the output document set in accordance with said back cover parameters;

means for scanning the original document sheets that comprise said job, so as to produce a string of equivalent electronic pages, each with an image thereon, for all output document sheets;

means for arranging said equivalent electronic pages in the order in which said job has been programmed for printing;

means for altering the order of images on said equivalent electronic pages in accordance with said front cover parameters;

means for altering the order of images on said equivalent electronic pages in accordance with said back cover parameters; and means for printing the equivalent electronic pages of said output document set.

4. The electronic reprographic system of claim 3, wherein the means for programming a set of front cover parameters further comprises:

means for visually displaying said front cover parameters on a display screen;

means, responsive to the operator's selection, for displaying the possible paper stock options for said front cover sheet;

means for selecting said paper stock options to be used in the production of said front cover sheet;

means, responsive to the operator's selection, for displaying the possible printing options for said front cover sheet; and means for selecting one of said possible printing options to be used in the production of said front cover sheet.

5. The electronic reprographic system of claim 3, wherein the means for programming a set of back cover parameters further comprises:

means for visually displaying said back cover parameters on a display screen;

means, responsive to the operator's selection, for displaying the possible paper stock options for said back cover sheet;

means for selecting said paper stock options to be used in the production of said back cover sheet;

means, responsive to the operator's selection, for displaying the possible printing options for said back cover sheet; and means for selecting one of said possible printing options to be used in the production of said back cover sheet.

6. The electronic reprographic system of claim 3, wherein the means for arranging said equivalent electronic pages in the order in which said job has been programmed for printing further comprises:

means for determing the programmed printing output mode for said job; and means for arranging said equivalent electronic pages in a simplex or duplex fashion in accordance with said output mode.

7. The electronic reprographic system of claim 3, wherein the means for altering the order of images on said equivalent electronic pages in accordance with said front cover parameters further comprises:

means for determining the programmed printing output mode for said job;

means for adding a blank electronic page to the end of said string of electronic pages;

means for shifting a subset of the images associated with said pages towards the end of said string of pages, whereby said shift will result in a blank page at the point where the last image was removed;

means for transferring the images associated with the first two pages of the string in accordance with the number of sides to be imaged on said front cover sheet; and means for deleting a blank second page that may result from the transferring of images therefrom.

8. The electronic reprographic system of claim 3, wherein the means for altering the order of images on said equivalent electronic pages in accordance with said back cover parameters further comprises:

means for determining the programmed printing output mode for said job;

means for adding a blank electronic page to the end of said string of electronic pages;

means for transferring the images associated with the last two pages of the string in accordance with the number of sides to be imaged on said back cover sheet; and means for deleting a blank second-to-last page that may result from the transferring of images therefrom.

9. The electronic reprographic system of claim 1, wherein said means for automatically reordering the electronic images comprises:

means for producing an ordered set of electronic images from said electronic representation of the set of original documents;

means for inserting a blank electronic image into said ordered set of electronic images;

means, responsive to the desired front and back cover sheet features and the plex of the output document, for altering the order of said set of electronic images to produce a set of reordered electronic images suitable for printing.

* * * * *